United States Patent
Kwag

(10) Patent No.: US 11,362,390 B2
(45) Date of Patent: Jun. 14, 2022

(54) BATTERY PACK

(71) Applicant: Samsung SDI Co., Ltd., Yongin-si (KR)

(72) Inventor: Nohyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 234 days.

(21) Appl. No.: 16/596,583

(22) Filed: Oct. 8, 2019

(65) Prior Publication Data

US 2020/0112008 A1    Apr. 9, 2020

(30) Foreign Application Priority Data

Oct. 8, 2018   (KR) .................. 10-2018-0119749

(51) Int. Cl.
  *H01M 50/20*   (2021.01)
  *H01M 10/613*   (2014.01)
  *H01M 10/625*   (2014.01)
  *H01M 10/643*   (2014.01)
  *H01M 10/6567*   (2014.01)

(52) U.S. Cl.
  CPC ......... *H01M 50/20* (2021.01); *H01M 10/613* (2015.04); *H01M 10/625* (2015.04); *H01M 10/643* (2015.04); *H01M 10/6567* (2015.04); *H01M 2220/20* (2013.01)

(58) Field of Classification Search
  CPC .................................................. H01M 50/20
  See application file for complete search history.

(56) References Cited

U.S. PATENT DOCUMENTS

| | | |
|---|---|---|
| 5,578,392 A | 11/1996 | Kawamura |
| 6,379,837 B1 | 4/2002 | Takahashi et al. |
| 7,924,562 B2 | 4/2011 | Soma et al. |
| 8,841,018 B2 | 9/2014 | Nakano et al. |

(Continued)

FOREIGN PATENT DOCUMENTS

| | | | | |
|---|---|---|---|---|
| DE | 102008010820 A1 | * | 8/2009 | .......... H01M 10/613 |
| DE | 102008059967 A1 | * | 6/2010 | .......... H01M 10/643 |

(Continued)

OTHER PUBLICATIONS

TranslationDE102008059967 (Year: 2021).*

(Continued)

*Primary Examiner* — Brian R Ohara
(74) *Attorney, Agent, or Firm* — Lewis Roca Rothgerber Christie LLP

(57) ABSTRACT

A battery pack includes: a plurality of battery cells; a case providing an accommodation space for accommodating the battery cells and a cooling fluid for cooling the battery cells; and a barrier wall extending across the accommodation space and dividing the accommodation space into an upstream area in communication with an inlet for the cooling fluid and a downstream area in communication with an outlet for the cooling fluid. The barrier wall provides a communication area where the upstream area and the downstream area communicate with each other. The inlet and the outlet are at a first end of the barrier wall in an extension direction of the barrier wall, and the communication area is at a second end of the barrier wall in the extension direction of the barrier wall.

22 Claims, 12 Drawing Sheets

(56) References Cited

U.S. PATENT DOCUMENTS

| | | |
|---|---|---|
| 9,105,900 B2 | 8/2015 | Kano |
| 9,847,182 B2 | 12/2017 | Kusaba et al. |
| 10,065,523 B2 | 9/2018 | Wood et al. |
| 10,347,881 B2 | 7/2019 | Han |
| 2007/0026303 A1 | 2/2007 | Jeon et al. |
| 2008/0311468 A1* | 12/2008 | Hermann .......... H01M 50/20 429/120 |
| 2009/0202897 A1 | 8/2009 | Kim et al. |
| 2011/0008667 A1 | 1/2011 | Kwag et al. |
| 2011/0027631 A1 | 2/2011 | Koenigsmann |
| 2011/0305930 A1 | 12/2011 | Han |
| 2012/0251872 A1 | 10/2012 | Kim |
| 2012/0315507 A1 | 12/2012 | Kim |
| 2014/0093755 A1 | 4/2014 | Houchin-Miller et al. |
| 2015/0118530 A1 | 4/2015 | Lee |
| 2015/0255225 A1 | 9/2015 | Kusaba et al. |
| 2017/0025717 A1 | 1/2017 | Zeller et al. |
| 2018/0301771 A1 | 10/2018 | Jennrich et al. |
| 2019/0067655 A1 | 2/2019 | Nakamura et al. |
| 2020/0044200 A1 | 2/2020 | Ochs et al. |

FOREIGN PATENT DOCUMENTS

| | | | | |
|---|---|---|---|---|
| DE | 102009035487 A1 * | 2/2011 | .......... | H01M 10/625 |
| DE | 10-2016-219302 A1 | 4/2018 | | |
| EP | 2302726 A1 | 3/2011 | | |
| EP | 2357688 A1 | 8/2011 | | |
| EP | 2866295 A1 | 4/2015 | | |
| EP | 3217452 A1 | 9/2017 | | |
| JP | 1999-67178 A | 3/1999 | | |
| JP | 4025928 B2 | 10/2007 | | |
| JP | 4631118 B2 | 11/2010 | | |
| JP | 4791076 B2 | 7/2011 | | |
| JP | 5057720 B2 | 8/2012 | | |
| JP | 5173227 B2 | 1/2013 | | |
| JP | 2013-114780 A | 6/2013 | | |
| JP | 2014-197452 A | 10/2014 | | |
| JP | 2015-133266 A | 7/2015 | | |
| KR | 10-2010-0057691 A | 5/2010 | | |
| KR | 10-2012-0082579 A | 7/2012 | | |
| KR | 10-2013-0035200 A | 4/2013 | | |
| KR | 10-2015-0054532 A | 5/2015 | | |
| KR | 10-2015-0070241 A | 6/2015 | | |
| KR | 10-2017-0018448 A | 2/2017 | | |
| KR | 10-2017-0106933 A | 9/2017 | | |
| KR | 10-2018-0063113 A | 6/2018 | | |
| KR | 10-2018-0092191 A | 8/2018 | | |
| WO | WO 2013-018151 A1 | 2/2013 | | |
| WO | WO 2015/094035 A1 | 6/2015 | | |
| WO | 2016/185970 A1 | 11/2016 | | |
| WO | 2017/175487 A1 | 10/2017 | | |
| WO | WO 2018/147545 A1 | 8/2018 | | |

OTHER PUBLICATIONS

TranslationDE102008010820 (Year: 2021).*
TranslationDE102009035487 (Year: 2021).*
EPO Extended Search Report dated Mar. 20, 2020, corresponding to European Patent Application No. 19202014.7 (15 pages).
EPO Office Action dated Dec. 10, 2020, issued in European Patent Application No. 19202070.9 (5 pages).
EPO Extended Search Report dated Feb. 28, 2020, corresponding to European Patent Application No. 19202070.9 (8 pages).
EPO Extended Search Report dated Feb. 28, 2020, corresponding to European Patent Application No. 19202039.4 (5 pages).
U.S. Office Action dated Jun. 25, 2021, issued in U.S. Appl. No. 16/596,503 (15 pages).
U.S. Office Action dated May 4, 2021, issued in U.S. Appl. No. 16/595,906 (30 pages).
EPO Extended Search Report dated Apr. 17, 2020, for corresponding European Patent Application No. 19202074.1 (5 pages).
Korean Office Action dated Nov. 26, 2019, corresponding to Korean Patent Application No. 10-2018-0123928 (56 pages).
EPO Extended European Search Report dated Aug. 4, 2020, issued in European Patent Application No. 19202014.7 (12 pages).
Korean Office Action dated Oct. 5, 2020, issued in Korean Patent Application No. 10-2020-0099831 (11 pages).
Metals 2020, 10, 1315; doi:10.3390/met10101315 (Year: 2016).
U.S. Final Office Action dated Sep. 29, 2021, issued in U.S. Appl. No. 16/595,906, 36 pages.
U.S. Final Office Action dated Nov. 12, 2021, issued in U.S. Appl. No. 16/596,503 (15 pages).
U.S. Restriction Requirement from U.S. Appl. No. 16/595,900, dated Dec. 13, 2021, 6 pages.
U.S. Restriction Requirement from U.S. Appl. No. 16/596,503, dated Apr. 6, 2021, 7 pages.
U.S. Notice of Allowance from U.S. Appl. No. 16/595,906, dated Mar. 17, 2022, 9 pages.

* cited by examiner

BATTERY PACK

CROSS-REFERENCE TO RELATED APPLICATIONS

This application claims the benefit of and priority to Korean Patent Application No. 10-2018-0119749, filed on Oct. 8, 2018 in the Korean Intellectual Property Office, the disclosure of which is incorporated herein in its entirety by reference. This application incorporates, in their entirety, by reference U.S. application Ser. Nos. 16/596,503, 16/595,906, and 16/595,900, filed on even date herewith.

BACKGROUND

1. Field

Aspects of one or more embodiments of the present disclosure relate to a battery pack.

2. Description of the Related Art

In general, secondary batteries are designed to be rechargeable unlike primary batteries, which are not designed to be recharged. Secondary batteries are used as energy sources for devices, such as mobile devices, electric vehicles, hybrid electric vehicles, electric bicycles, and uninterruptible power supplies. Single-cell secondary batteries or multi-cell secondary batteries (e.g., secondary battery packs) in which a plurality of battery cells are electrically connected to each other are used according to the type of external device to be powered by the secondary batteries.

Small mobile devices, such as cellular phones, may be operated by using single-cell secondary batteries (e.g., may be operated for a predetermined time by using single-cell secondary batteries). However, multi-cell secondary batteries (e.g., secondary battery packs) having high-output, high-capacity features may be suitable for devices having long operating times and requiring high power, such as electric vehicles or hybrid electric vehicles, which consume relatively large amounts of power. The output voltage or current of a battery pack may be increased by adjusting the number of batteries (e.g., the number of battery cells) included in the battery pack.

SUMMARY

One or more embodiments of the present disclosure include a battery pack having an accommodation space through which a cooling fluid flows and makes direct contact with battery cells to provide improved heat dissipation.

One or more embodiments of the present disclosure include a battery pack having a relatively simple inlet/outlet connection structure that improves the cooling performance of the cooling fluid.

Additional aspects of the present disclosure will be set forth, in part, in the description which follows and, in part, will be apparent from the description or may be learned by practice of the presented embodiments.

According to one or more embodiments, a battery pack includes: a plurality of battery cells; a case providing an accommodation space for accommodating the battery cells and a cooling fluid for cooling the battery cells; and a barrier wall extending across the accommodation space and dividing the accommodation space into an upstream area in communication with an inlet for the cooling fluid and a downstream area in communication with an outlet for the cooling fluid. The barrier wall provides a communication area where the upstream area and the downstream area communicate with each other. The inlet and the outlet are at a portion of the case corresponding to a first end of the barrier wall in an extension direction of the barrier wall, and the communication area is at a second end of the barrier wall in the extension direction of the barrier wall.

The communication area may be configured to reverse a direction of an upstream flow of the cooling fluid from the inlet at the first end of the barrier wall to a downstream flow toward the outlet at the first end of the barrier wall.

Both the inlet and the outlet for the cooling fluid may be provided in a first short-side portion of the case.

A second short-side portion of the case opposite the first short-side portion may not include an inlet or an outlet for the cooling fluid.

The communication area may include an opening in the second end of the barrier wall.

The barrier wall may have a step difference between a first height at the first end of the barrier wall and a second height at the second end of the barrier wall, and the communication area may be formed by the step difference between the first height and the second height.

A first section of the barrier wall having the second height may be at a middle position of a second section of the barrier wall having the first height such that an upper step difference and a lower step difference are formed between the first and second sections of the barrier wall.

The communication area may include: a first communication area formed by the upper step difference; and a second communication area formed by the lower step difference.

The battery cells may be arranged in a plurality of rows extending in the extension direction of the barrier wall, and the barrier wall may extend along a gap between a first row and a second row to divide the rows of the battery cells into two groups.

The first and second rows may be adjacent to each other such that the battery cells of the first row are at least partially between the battery cells of the second row, and the barrier wall may have a zigzag shape along the gap between the first and second rows.

The case may include a first cover, a middle case, and a second cover. The first and second covers may face each other with the middle case therebetween, and the first and second covers may be coupled to the middle case.

The barrier wall and the middle case may be integrally formed by injection molding.

The middle case and the first and second covers may be formed separately from each other, and the case and the first and second covers may seal the accommodation space.

The case may include: a first laser weld zone along a boundary between the middle case and the first cover; and a second laser weld zone along a boundary between the middle case and the second cover.

The middle case and the first and second covers may include an engineering plastic material for injection molding and laser welding.

The first and second covers may include guide ribs protruding from the first and second covers and extending around first and second end portions of the battery cells.

The guide ribs may have a ring shape and may surround peripheries of the first and second end portions of the battery cells.

The guide ribs may be arranged in rows such that the guide ribs of one row are between the guide ribs of an adjacent row. The guide ribs may be spaced apart from each other by gap portions, and the guide ribs may face each other with the gap portions therebetween.

Each of the gap portions may be in a space between four adjacent guide ribs.

Peripheries of each of the gap portions may be surrounded by the guide ribs.

The barrier wall may include first and second coupling portions arranged from the first end to the second end of the barrier wall in the extension direction of the barrier wall. Each of the first and second coupling portions may protrude toward respective ones of the gap portions of the first and second covers, and the first and second coupling portions may be respectively fitted into the gap portion of the first and second covers and are welded thereto.

The barrier wall and the middle case may be integrally formed by injection molding, and the first and second coupling portions may protrude from the barrier wall toward the first and second covers.

BRIEF DESCRIPTION OF THE DRAWINGS

These and/or other aspects of the present disclosure will become apparent and more readily appreciated from the following description of example embodiments, taken in conjunction with the accompanying drawings in which.

DETAILED DESCRIPTION

Figure 1:
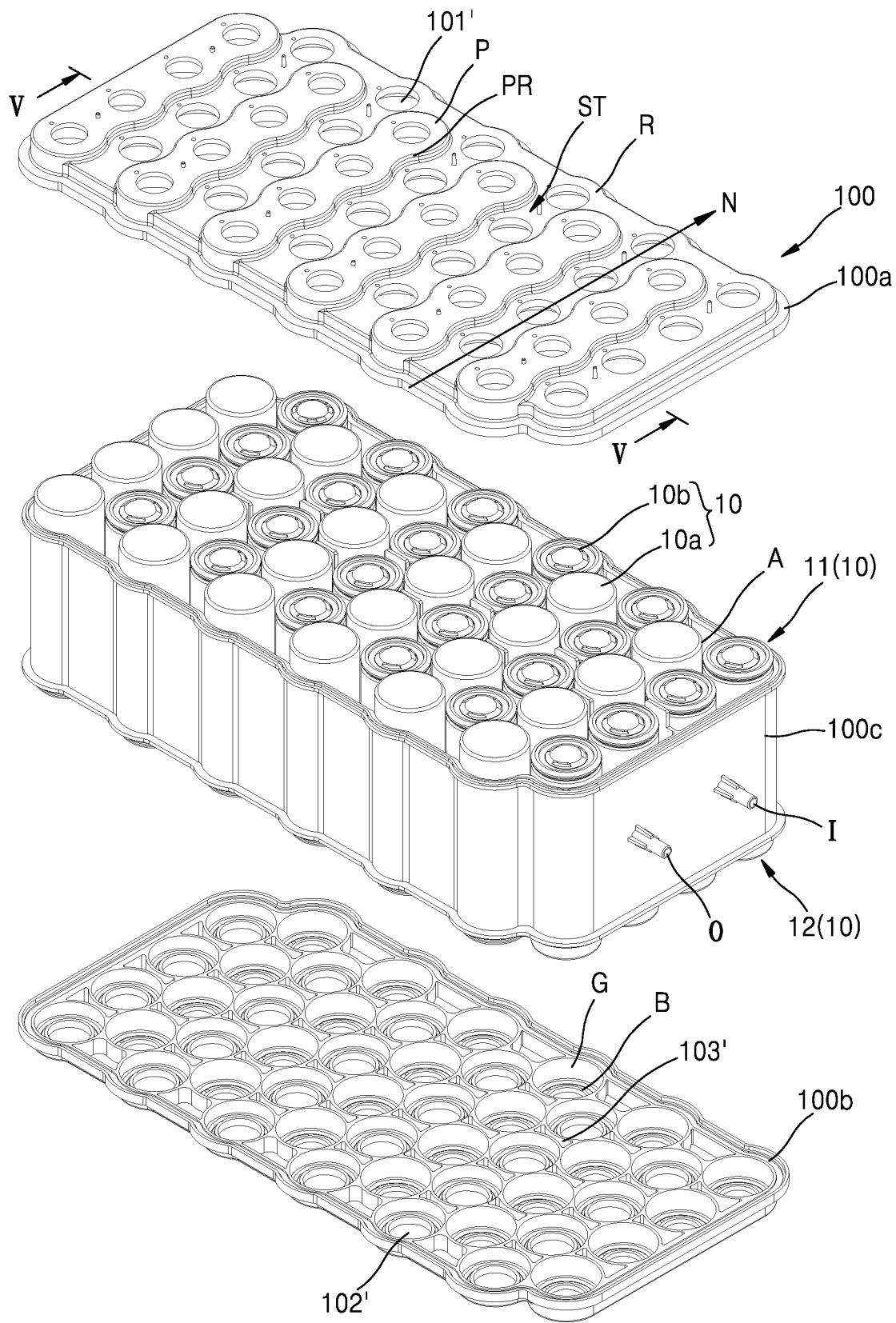
FIG. 1 is an exploded perspective view illustrating a battery pack according to an embodiment of the present disclosure.

Reference will now be made in detail to embodiments, examples of which are illustrated in the accompanying drawings. In this regard, the presented embodiments may have different forms, and the present disclosure should not be construed as being limited to the descriptions set forth herein. Accordingly, the presented embodiments are merely described below, by referring to the figures, to explain aspects of the present disclosure. As used herein, the term "and/or" includes any and all combinations of one or more of the associated listed items. Expressions, such as "at least one of," when preceding a list of elements, modify the entire list of elements and do not modify the individual elements of the list.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. The use of "may" when describing embodiments of the present invention relates to "one or more embodiments of the present invention." Also, the term "exemplary" is intended to refer to an example or illustration. As used herein, the term "about" and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The circuit components and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various circuit components may be formed on one integrated circuit (IC) chip or on separate IC chips. Further, the various circuit components may be implemented on a flexible printed circuit film, a tape carrier package (TCP), a printed circuit board (PCB), or formed on a same substrate as the circuit components. Further, the various circuit components may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Battery packs, according to embodiments of the present disclosure, will now be described with reference to the accompanying drawings.

Figure 2:
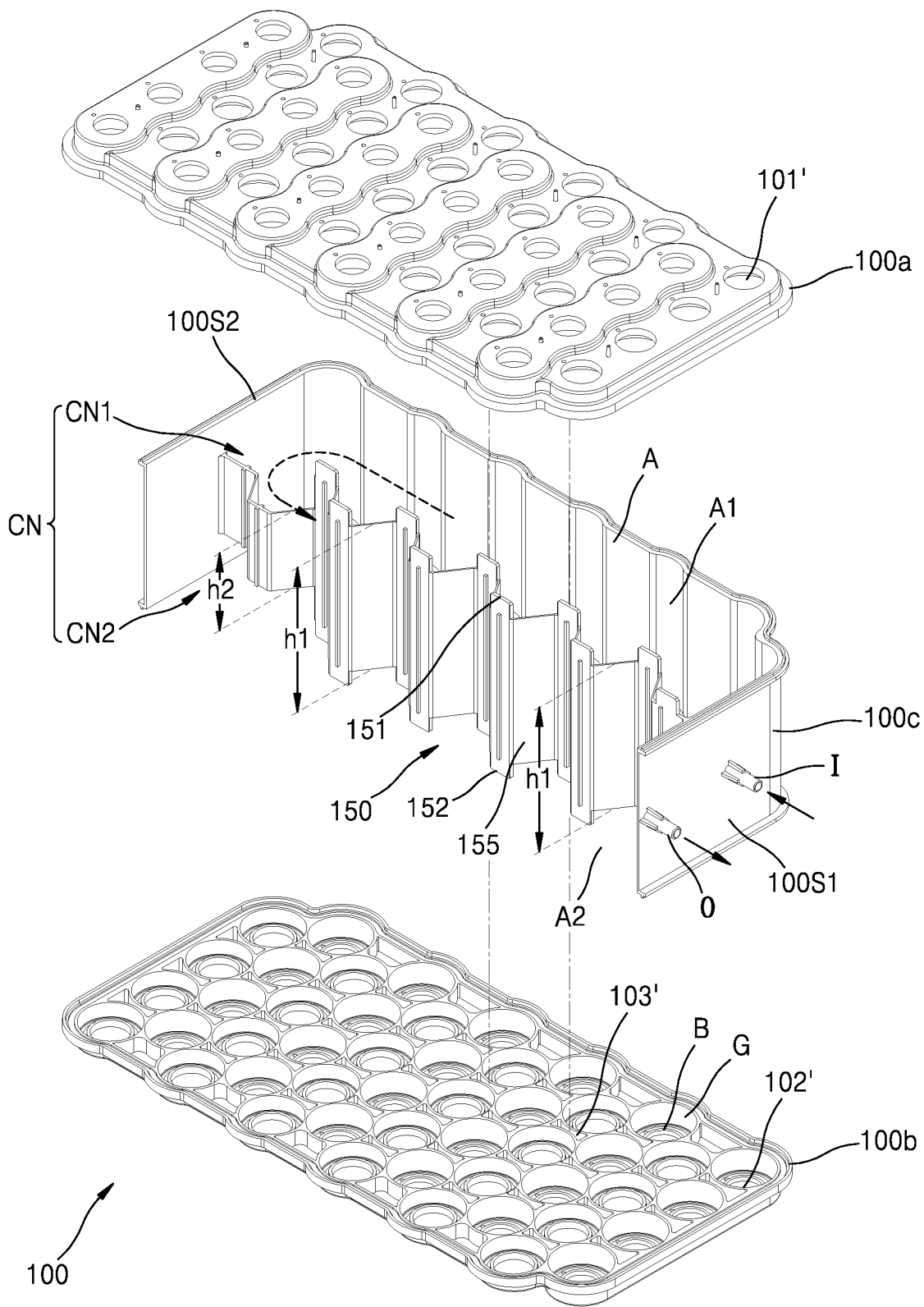
FIG. 2 is an exploded perspective view illustrating a case shown in FIG. 1.
Figure 3:
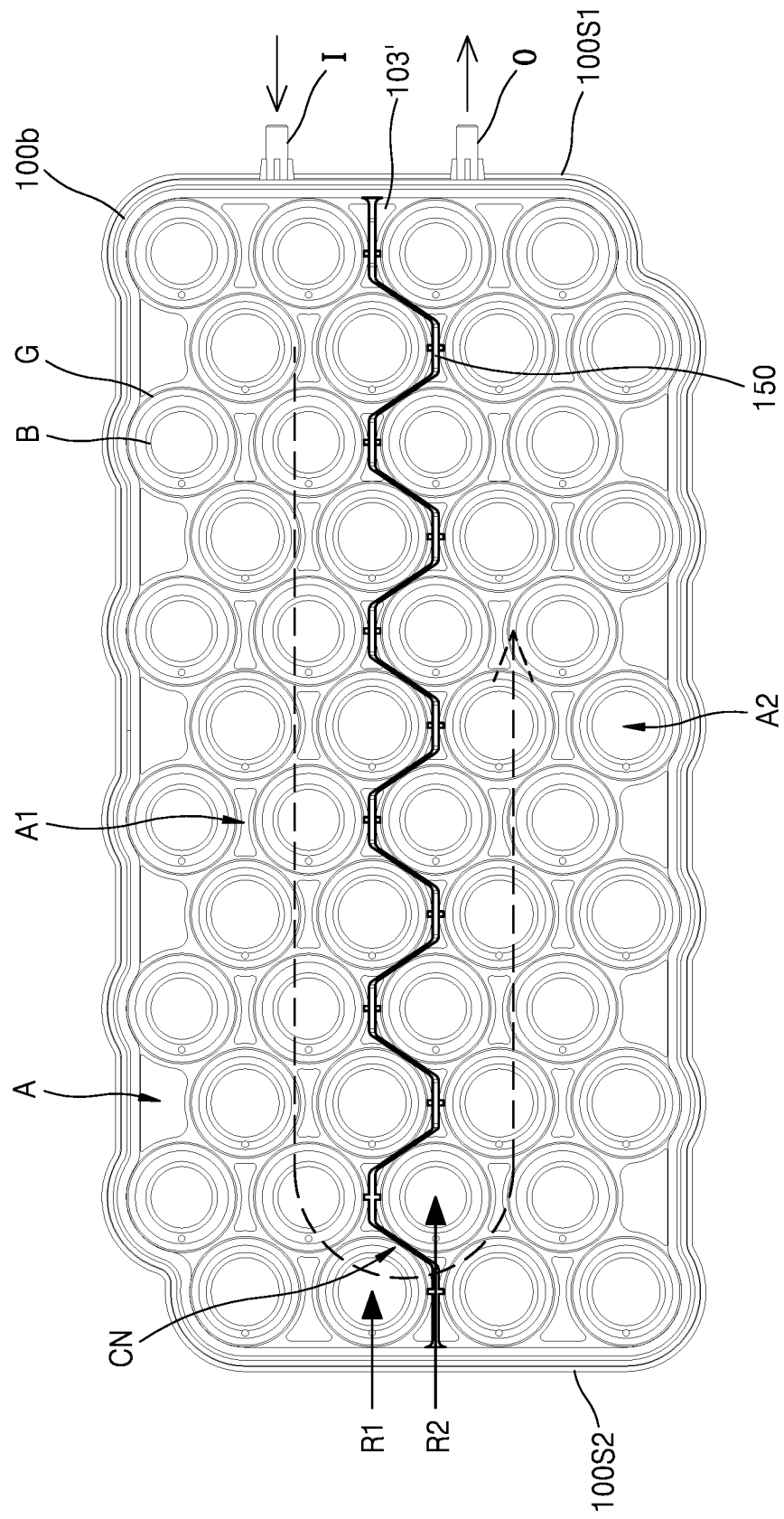
FIG. 3 is a view illustrating a flow of a cooling fluid in the case shown in FIG. 2.

FIG. 1 is an exploded perspective view illustrating a battery pack according to an embodiment of the present disclosure, FIG. 2 is an exploded perspective view illustrating a case 100 shown in FIG. 1, and FIG. 3 is a view illustrating flow of a cooling fluid in the case 100 shown in FIGS. 1 and 2.

Referring to FIGS. 1-3, the battery pack according to an embodiment of the present disclosure may include a plurality of battery cells 10 and the case 100, which provides an accommodation space A in which the battery cells 10 and a cooling fluid for cooling the battery cells 10 are accommodated.

The case 100 may include a middle case 100c and first and second covers 100a and 100b, which face each other with the middle case 100c therebetween. The first and second covers 100a and 100b may cover first and second end portions 11 and 12 of the battery cells 10, which correspond to respective ends of the battery cells 10 in the length direction of the battery cells 10.

The case 100 may include (or may be divided into) three parts (e.g., the case 100 may have a shape that is divided into three parts), that is, the middle case 100c and the first and second covers 100a and 100b, and the accommodation space A may be sealed by coupling the middle case 100c and the first and second covers 100a and 100b to each other. The middle case 100c may be coupled to each of the first and second covers 100a and 100b by a laser welding method. Thus, a first laser weld zone L1 (see, e.g., FIG. 8) may be formed along a boundary between the middle case 100c and the first cover 100a, and a second laser weld zone L2 (see, e.g., FIG. 8) may be formed along a boundary between the middle case 100c and the second cover 100b. Because the case 100 includes three parts—the middle case 100c and the first and second covers 100a and 100b—laser welding may be performed on upper and lower portions of the battery pack (e.g., a laser welding tip may be provided close to the upper and lower portions of the battery pack), and the case 100 and/or the laser welding tip may be adjusted in such a manner that the welding positions may be easily exposed to a laser beam that is emitted in an oblique direction toward the upper and lower portions of the battery pack. Thus, laser welding may be easily performed.

The middle case 100c and the first and second covers 100a and 100b may be formed by an injection molding method and may include an engineering plastic material suitable for injection molding and laser welding. For example, the middle case 100c and the first and second covers 100a and 100b may include a polyamide-based material including glass fiber.

When a laser welding process is performed on a stack of two base materials, the base material that is relatively close to a laser welding tip (e.g., close to a laser beam emission direction) should be transparent or at least partially transparent to the laser beam, and the other base material, which is relatively distant from the laser welding tip, should absorb or at least partially absorb the laser beam. The middle case 100c and the first and second covers 100a and 100b may include a polyamide-based material including glass fiber that satisfies the above-described optical conditions for the laser welding process.

Referring to FIGS. 1 and 2, guide ribs G may be formed on the second cover 100b. The guide ribs G may define assembly positions of the battery cells 10 and may protrude from the second cover 100b toward the second end portions 12 of the battery cells 10 to surround (e.g., to surround a periphery of) the second end portions 12 of the battery cells 10. Guide ribs G, similar to the guide ribs G formed on the second cover 100b, may also be formed on the first cover 100a to define assembly positions of the battery cells 10. The guide ribs G may protrude from the first cover 100a toward the first end portions 11 of the battery cells 10 to surround (e.g., to surround a periphery of) the first end portions 11 of the battery cells 10. Ones of the guide ribs G on the first and second covers 100a and 100b may surround the first and second end portions 11 and 12 of the same battery cells 10 to delimit the assembly positions of the battery cells 10 and, thus, may be formed at positions corresponding to (e.g., in alignment with) each other.

Gap portions (e.g., gaps) 103' may be formed between (e.g., may be formed between adjacent ones of) the guide ribs G. For example, each of the gap portions 103' may be provided in a surplus space from among (e.g., between) four neighboring guide ribs G having adjacent peripheries. As described further below, the gap portions 103' may provide coupling positions for a barrier wall 150, which is installed in the case 100. For example, the gap portions 103' of the first and second covers 100a and 100b may be formed at positions corresponding to (e.g., aligned with) each other to provide coupling positions for the barrier wall 150 in the case 100. Further technical aspects of the guide ribs G and the gap portions 103' will be described further below.

The first and second covers 100a and 100b may cover the first and second end portions 11 and 12 of the battery cells 10, and the middle case 100c may cover most of the length of the battery cells 10. In some embodiments, the middle case 100c may be longer than the first and second covers 100a and 100b in the length direction of the battery cells 10. The middle case 100c may define the accommodation space A while surrounding the peripheries of the battery cells 10 and may be formed in one piece with (e.g., may be integrally formed with) the barrier wall 150, which is provided inside the accommodation space A. That is, in some embodiments, the middle case 100c and the barrier wall 150 may be formed in one piece (e.g., may be integrally formed) by an injection molding method.

Referring to FIGS. 2 and 3, the case 100 may accommodate a flow of cooling fluid for cooling the battery cells 10, and the barrier wall 150 may be provided in the case 100 across the accommodation space A to divide the accommodation space A into an upstream area A1 and a downstream area A2. The upstream area A1 may be connected to (e.g., nearer to and/or in communication with) an inlet I in the middle case 100c for the cooling fluid such that the cooling fluid may be introduced into the upstream area A1 at a relatively low temperature, and the downstream area A2 may be connected to (e.g., nearer to and/or in communication with) an outlet O in the middle case 100c for the cooling fluid such that the cooling fluid may be discharged from the downstream area A2 at a relatively high temperature. The inlet I and the outlet O for the cooling fluid may be formed in an end side of the middle case 100c in an extension direction of the barrier wall 150, and a communication area CN connecting the upstream area A1 and the downstream area A2 to each other (e.g., allowing the upstream area A1 and the downstream area A2 to communicate with each other) may be formed in the barrier wall 150 (e.g., may be formed by a gap between the middle case 100c, the first and second covers 100a and 100b, and the barrier wall 150) at or adjacent the other end side of the middle case 100c in the extension direction of the barrier wall 150. The communication area CN may connect the upstream area A1 and the downstream area A2 to each other such that the cooling fluid may flow from the inlet I at the end side of the middle case 100c to the other end side of the middle case 100c in the upstream area A1 and may be reversed, like a U-turn, to flow from the other end side of the middle case 100c toward the outlet O in the downstream area A2.

The inlet I and the outlet O may be formed in an end side of the middle case 100c in the extension direction of the barrier wall 150. For example, both the inlet I and the outlet O may be formed in a first short-side portion 10051 of the case 100. As described above, the inlet I and the outlet O are both formed in the first short-side portion 100S1 instead of, for example, being respectively formed in first and second short-side portions 100S1 and 100S2 (e.g., the second short-side portion 100S2 may not include an inlet or outlet for the cooling fluid). Therefore, external fluid connection to the case 100 may be easily made. For example, the case 100 (e.g., the middle case 100c) may include a pair of long-side portions parallel to the extension direction of the barrier wall 150 and the first and second short-side portions 100S1 and 100S2 connecting (e.g., extending between) the pair of long-side portions, and the inlet I and the outlet O may be formed in the first short-side portion 100S1. For example, in some embodiments, neither the inlet I nor the outlet O may be formed in the second short-side portion 100S2 opposite the first short-side portion 100S1.

In some embodiments of the present disclosure, the inlet I and the outlet O are formed in the first short-side portion 10051, and the cooling fluid flow is reversed, like a U-turn, at an end of the barrier wall 150 near the second short-side portion 100S2 to allow the cooling fluid to flow (e.g., to flow continuously) from the inlet I to the outlet O using (e.g., in a flow path defined at least in part by) the barrier wall 150. Therefore, the cooling fluid may experience relatively large flow resistance, and thus, the flow of the cooling fluid may be adjusted such that the inside (e.g., the accommodation space A) of the case 100 may be fully or almost fully filled with the cooling fluid. If sufficient flow resistance were not applied to the flow of the cooling fluid, for example, if the cooling fluid flows in only one direction from the first short-side portion 100S1 to the second short-side portion 100S2 of the case 100, the cooling fluid may flow without filling a remote portion of the accommodation space A, such as an upper or corner portion of the case 100, thereby insufficiently cooling at least some of the battery cells 10.

According to embodiments of the present disclosure, the accommodation space A for the battery cells 10 is divided into two parts: the upstream area A1 connected to the inlet I for the cooling fluid; and the downstream area A2 connected to the outlet O for the cooling fluid. Therefore, a cross-sectional area through which the cooling fluid flows in one direction (e.g., an area from which heat is to be dissipated) may be about one-half of the cross-sectional area of the accommodation space A, and thus, the heat-dissipating performance of the cooling fluid may be improved. If the cooling fluid were to flow in only one direction from the first short-side portion 10051 to the second short-side portion 10052 of the case 100, the cross-sectional area through which the cooling fluid flows in one direction (e.g., the area from which heat is to be dissipated) may be about equal to the cross-sectional area of the accommodation space A. Thus, to reduce, by about half, the cross-sectional area through which the cooling fluid flows in one direction, the pair of the inlet I and the outlet O may be provided to each of the first and second short-side portions 10051 and 10052. This arrangement may, however, complicate a cooling fluid connection structure and increase the possibility of leakage of the cooling fluid.

According to various embodiments of the present disclosure, inlets I and outlets O may be distributed in the first and second short-side portions 100S1 and 10052 in different numbers. For example, a plurality of inlets I and a plurality of outlets O may be distributed in the first and second short-side portions 10051 and 10052. For example, a plurality of barrier walls 150 may be provided, and the inlet I and the outlet O may be provided in each region divided by the barrier walls 150. For example, a plurality of inlets I and a plurality of outlets O may be formed in the case 100, and in some embodiments, the number of the inlets I and the number of the outlets may be different from each other. However, in the embodiment shown in FIG. 2, the inlet I and the outlet O are both formed in the first short-side portion 10051. That is, one inlet I and one outlet O are provided as a pair. In this embodiment, as described above, fluid connection to the case 100 may be easily made, and cooling of a remote region of the case 100, such as an upper or corner region, may be improved. In addition, the cross-sectional area through which the cooling fluid flows in one direction (e.g., the area from which heat is to be dissipated) may be reduced, and thus, the heat-dissipating performance of the cooling fluid may be improved.

Referring to FIG. 3, the guide ribs G and/or the battery cells 10 may be arranged in rows in the extension direction of the barrier wall 150, and in such an embodiment, the barrier wall 150 may extend along a gap between first and second rows R1 and R2 of the guide ribs G and/or the battery cells 10 that neighbor each other and divide the rows of the guide ribs G and/or the battery cells 10 in the case 100 into two groups (e.g., two equal groups).

In an embodiment of the present disclosure, the guide ribs G and/or the battery cells 10 may be arranged in eight rows in the extension direction of the barrier wall 150, and in this embodiment, the barrier wall 150 may divide the eight rows into two equal groups, each including four rows, to form the upstream area A1 and the downstream area A2. In this manner, the number of battery cells 10 included in the upstream area A1 is adjusted to be approximately equal to the number of battery cells 10 included in the downstream area A2 such that the heat-dissipating burden on the cooling fluid may be equally distributed in the upstream area A1 and the downstream area A2.

The barrier wall 150 may extend along the gap between the first and second rows R1 and R2, which are adjacent to each other. The guide ribs G and/or the battery cells 10 of the first row R1 are inserted between the guide ribs G and/or the battery cells 10 of the second row R2 (e.g., the guide ribs G and/or the battery cells 10 of the first row R1 and the guide ribs G and/or the battery cells 10 of the second row R2 at least partially overlap each other in a direction perpendicular to the extension direction of the barrier wall 150), and thus, the barrier wall 150 may extend in a meandering shape along the gap between the first and second rows R1 and R2. For example, the barrier wall 150 may extend in a zigzag shape along outer surfaces of the guide ribs G and/or the battery cells 10 of the first and second rows R1 and R2, and thus, the barrier wall 150 may include a plurality of bent portions.

Referring to FIG. 2, the barrier wall 150 may include a main portion 155 extending across the accommodation space A and first and second coupling portions 151 and 152 arranged from one end to the other end of the barrier wall 150 in the extension direction of the main portion 155 and protruding toward (e.g., extending between) the first and second covers 100a and 100b, respectively, at intermittent positions (e.g., at regular intervals). The first and second coupling portions 151 and 152 may be coupled to the gap portions 103' of the first and second covers 100a and 100b, respectively.

The second coupling portions 152 may protrude from the main portion 155 of the barrier wall 150 and may contact the gap portions 103' of the second cover 100b, and the second coupling portions 152 may be welded to the second cover 100b at the gap portions 103' by a laser welding method. Thus, weld zones may be formed at the gap portions 103' of the second cover 100b as a result of welding of the second coupling portions 152. Similarly, the first coupling portions 151 may protrude from the main portion 155 of the barrier wall 150 and may contact the gap portions 103' of the first cover 100a, and the first coupling portions 151 may be welded to the first cover 100a at the gap portions 103' by a laser welding method. Thus, weld zones may be formed on the gap portions 103' of the first cover 100a as a result of welding of the first coupling portions 151. The first and second coupling portions 151 and 152 may be arranged at positions corresponding to each other (e.g., may be aligned with each other) in the extension direction of the barrier wall 150 and may be coupled to the gap portions 103' of the first and second covers 100a and 100b, which respectively correspond to the first and second coupling portions 151 and 152.

The barrier wall 150 may be formed in one piece with (e.g., may be integrally formed with) the middle case 100c. For example, the barrier wall 150 and the middle case 100c may be formed together by an injection molding method. In this embodiment, the first and second coupling portions 151 and 152 may protrude from the middle case 100c and may be coupled respectively to the first and second covers 100a and 100b at the gap portions 103' thereof.

The main portion 155 of the barrier wall 150 may have different first and second heights h1 and h2 along the extension direction of the barrier wall 150. The main portion 155 of the barrier wall 150 may have the first height h1 along most of its length from the end side (e.g., from the first short-side portion 10051) in which the inlet I and the outlet O are formed and may define the upstream area A1 and the downstream area A2 between the first and second covers 100a and 100b. To form the communication area CN, which connects the upstream area A1 and the downstream area A2 to each other at the other end side (e.g., at the second short-side portion 10052) opposite the end side in which the inlet I and the outlet O are formed, the main portion 155 of the barrier wall 150 may have the second height h2 at the other end side, and the second height h2 is less than the first height h1. Thus, the communication area CN may be formed by the difference between the first and second heights h1 and h2. For example, the main portion 155 of the barrier wall 150 may be stepped from the first height h1 at the end side to the second height h2 at the other end side (e.g., the barrier wall 150 may have a step difference between a portion thereof having the first height h1 and a portion thereof having the second height h2), and the communication area CN may be formed by the difference between the first and second heights h1 and h2.

As the ratio of the second height h2 to the first height h1 increases, the difference between the first and second heights h1 and h2 decreases, and the size of the communication area CN decreases, thereby increasing flow resistance of the cooling fluid and decreasing the velocity of the flow of the cooling fluid. However, the mechanical rigidity of the barrier wall 150 increases as the size of the communication area CN decreases. Conversely, as the ratio of the second height h2 to the first height h1 decreases, the difference between the first and second heights h1 and h2 increases, and the size of the communication area CN increases, thereby decreasing flow resistance of the cooling fluid and increasing the velocity of the flow of the cooling fluid. However, the mechanical rigidity of the barrier wall 150 decreases as the size of the communication area CN increases. According to embodiments of the present disclosure, the ratio of the second height h2 to the first height h1 may be determined to firmly maintain the shape of the barrier wall 150 and impart sufficient rigidity to the barrier wall 150 while considering driving power according to the flow resistance of the cooling fluid.

In the main portion 155, a section (e.g., a first section) of the barrier wall 150 having the second height h2 may be at (e.g., may extend from) a middle position of a section (e.g., a second section) of the barrier wall 150 having the first height h1 in the height direction of the barrier wall 150, and thus, an upper stepped section and a lower stepped section may be formed between the section having the second height h2 and the section having the first height h1. In this embodiment, the communication area CN may include a first communication area CN1 corresponding to the upper stepped section close to the first cover 100a and a second communication area CN2 corresponding to the lower stepped section close to the second cover 100b. In this embodiment, the cooling fluid may smoothly flow between the upstream area A1 and the downstream area A2 through the first and second communication areas CN1 and CN2 that are formed at opposite positions in the height direction of the barrier wall 150. For example, the cooling fluid that contacts sides of the first end portions 11 of the battery cells 10 may flow through the first communication area CN1, and the cooling fluid that contacts sides of the second end portions 12 of the battery cells 10 may flow through the second communication area CN2. For example, the first and second communication areas CN1 and CN2 may induce flow of the cooling fluid along the first and second end portions 11 and 12 of the battery cells 10, which generate relatively great amount of heat.

In an embodiment of the present disclosure, the communication area CN may be provided as openings corresponding to the difference between the first and second heights h1 and h2 of the main portion 155 of the barrier wall 150. In another embodiment of the present disclosure, the communication area CN may be provided as openings (e.g., hole-shaped openings) formed in the main portion 155 of the barrier wall 150 such that the cooling fluid may make a U-turn while continuously flowing from the upstream area A1 to the downstream area A2.

In an embodiment of the present disclosure, the communication area CN may be formed in the main portion 155 of the barrier wall 150. The main portion 155 of the barrier wall 150 may guide the flow of the cooling fluid by extending across the accommodation space A, and thus, the communication area CN for reversing (e.g., directing) the flow of the cooling fluid may be formed in the main portion 155. In another embodiment of the present disclosure, the barrier wall 150 may not include the first and second coupling portions 151 and 152, which are coupled to the first and second covers 100a and 100b in the other embodiment. In such an embodiment, because the main portion 155 is not distinguished from the first and second coupling portions 151 and 152, it may be considered that the communication area CN is formed in the barrier wall 150.

Figure 4A:
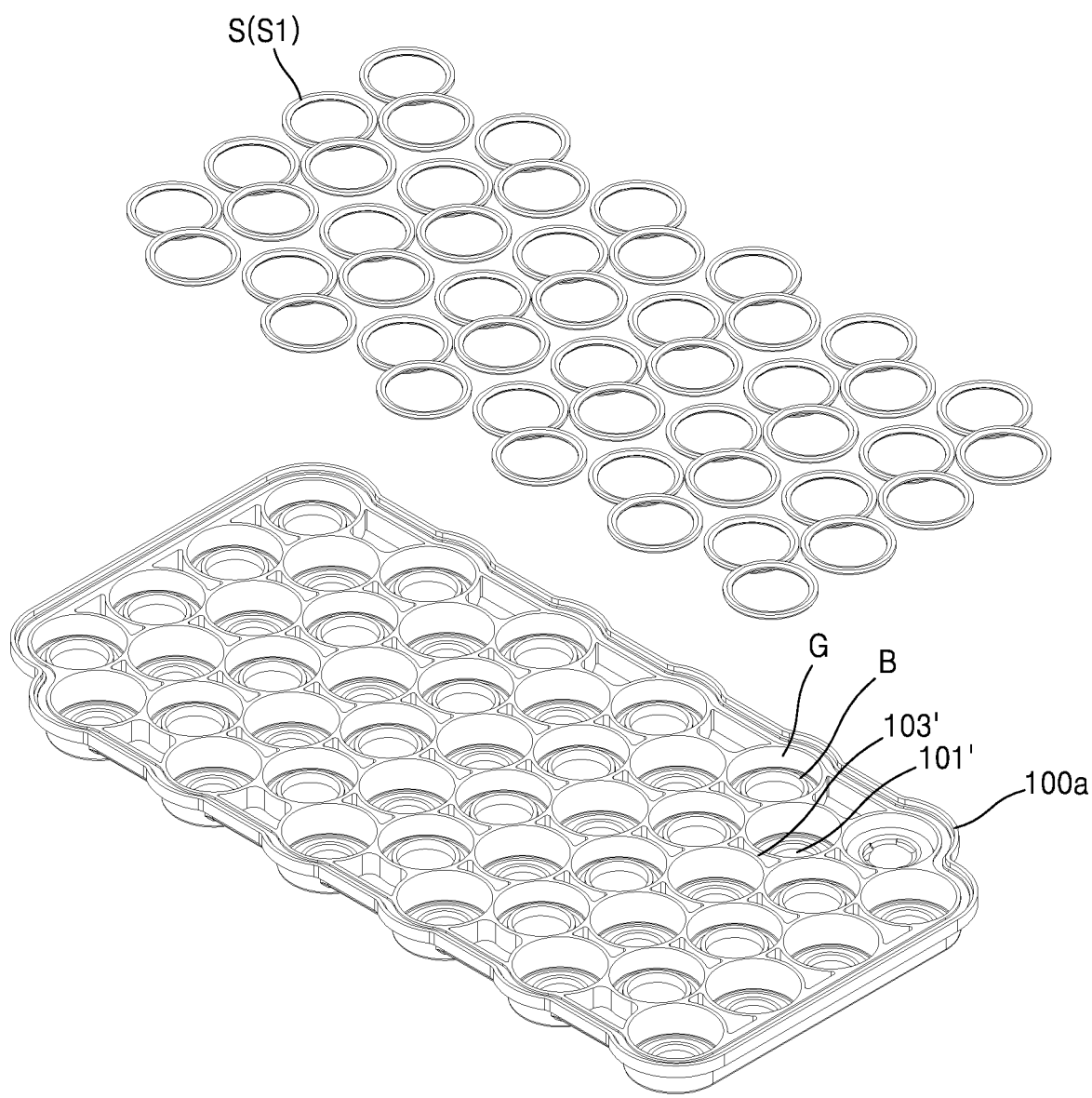
FIGS. 4A and 4B are an exploded perspective view and a plan view, respectively, illustrating a first cover shown in FIG. 1.
Figure 4B:
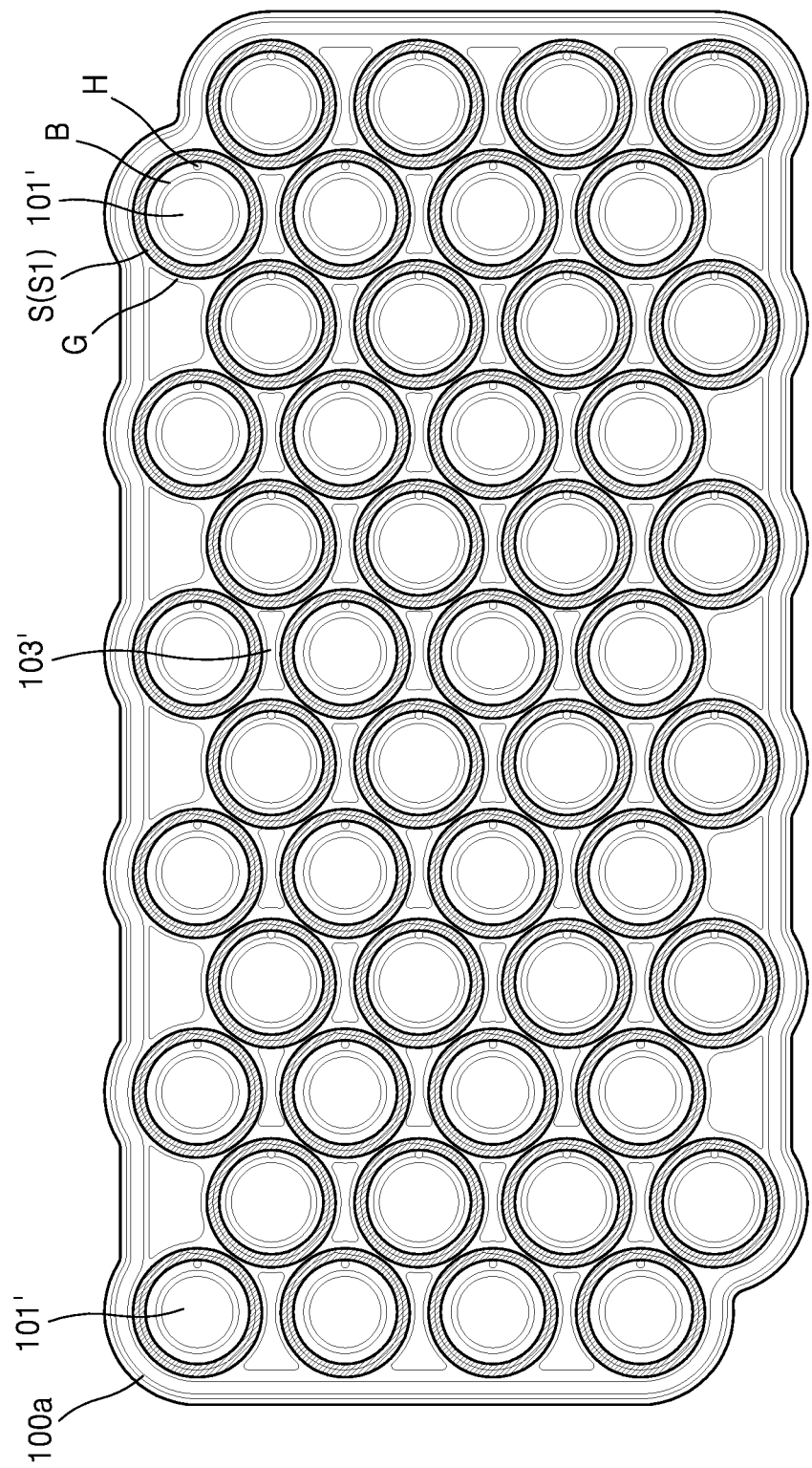

FIGS. 4A and 4B are an exploded perspective view and a plan view illustrating the first cover 100a shown in FIG. 1.

Referring to FIGS. 1, 4A, and 4B, the case 100 may hermetically contain a cooling fluid for cooling the battery cells 10, and the accommodation space A, which is filled with the cooling fluid, may be sealed to prevent leakage of the cooling fluid from the inside of the accommodation space A.

First and second terminal openings (e.g., first and second terminal holes) 101' and 102' may be formed in the first and second covers 100a and 100b of the case 100 to expose the first and second end portions 11 and 12 of the battery cells 10 therethrough, and the battery cells 10 may be electrically connected to each other through the first and second end portions 11 and 12 exposed by the first and second terminal openings 101' and 102'.

The first and second terminal openings 101' and 102' may expose center portions (e.g., only center portions) of the first and second end portions 11 and 12 of the battery cells 10 such that the first and second end portions 11 and 12 of the battery cells 10 may not pass through (e.g., may not completely pass through or may only partially pass through) the first and second terminal openings 101' and 102', and peripheral portions of the first and second end portions 11 and 12 may be covered by portions of the first and second covers 100a and 100b formed around the first and second terminal openings 101' and 102'.

Referring to FIGS. 1 and 4B, the guide ribs G may be formed on the first and second covers 100a and 100b. The guide ribs G surrounding the peripheries of the first and second end portions 11 and 12 of the battery cells 10 may be formed outside of barrier ribs B, which surround the first and second terminal openings 101' and 102', and the barrier ribs B and the guide ribs G that are located at inner sides and outer sides of the first and second terminal openings 101' and 102' may extend in parallel to each other in the shape of concentric circles from the first and second covers 100a and 100b toward the first and second end portions 11 and 12 of the battery cells 10. While regulating (e.g., defining) the assembly positions of the battery cells 10, the guide ribs G may fix sealing members S (see, e.g., FIG. 4B) in position from the outsides of the sealing members S and may, thus, prevent movement or wobbling of the sealing members S. Additional aspects of the barrier ribs B and the sealing members S will be described below.

The guide ribs G may have a ring shape to surround the peripheries of the first and second end portions 11 and 12 of the battery cells 10 and may be arranged in rows such that the guide ribs G of one row may be arranged in valleys between (e.g., in open spaces between) the guide ribs G of an adjacent row. The guide ribs G are formed at positions corresponding to the battery cells 10, which are also arranged such that battery cells 10 of one row are placed in valleys between the battery cells 10 of an adjacent row. Therefore, the guide ribs G may also be arranged in a pattern corresponding to the arrangement of the battery cells 10.

For example, the gap portions 103' may be formed between the guide ribs G such that each of the gap portions 103' is formed between adjacent guide ribs G facing each other with a valley therebetween. For example, each of the gap portions 103' may be provided in a surplus space from among (e.g., between) four neighboring guide ribs G having adjacent peripheries.

In some embodiments, the gap portions 103' may be formed to be (or may have) concave shape(s) with respect to protruded end portions of the guide ribs G such that the portions of the first and second cover 100a and 100b corresponding to the gap portions 103' may be thinner than the guide ribs G that protrude from the first and second covers 100a and 100b along the length direction of the first and second battery cells 10a and 10b to provide coupling positions for the barrier wall 150 (see, e.g., FIG. 2) and may reduce or prevent variations in the distance between adjacent ones of the guide ribs G caused by, at least in part, contraction of the gap portions 103' when a high-temperature molten resin is cooled to room temperature during an injection molding process.

The gap portions 103' may absorb tolerance of adjacent guide ribs G and may provide coupling positions for fixing the position of the barrier wall 150 (see, e.g., FIG. 2) provided in the case 100. The gap portions 103' may be thinner than the guide ribs G that protrude from the first and second covers 100a and 100b to provide coupling positions for the barrier wall 150 (see, e.g., FIG. 2) and may reduce or prevent variations in the distance between adjacent guide ribs G caused by contraction of the gap portions 103' when a high-temperature molten resin is cooled to room temperature during an injection molding process.

Referring to FIGS. 4A and 4B, the sealing members S may be arranged on the first cover 100a. For example, the sealing members S may be arranged around the first terminal openings 101' to block cooling fluid from leaking through the first terminal openings 101' (e.g., the sealing members S may seal an area around the first terminal openings 101'). Further, other sealing members S may be arranged around the second terminal openings 102' of the second cover 100b to block cooling fluid from leaking through the second terminal openings 102'. In the following description, the sealing members S arranged around the first terminal openings 101' will be primarily described, and the sealing members S arranged around the second terminal openings 102' may have substantially similar or the same aspects and features as the sealing members S arranged around the first terminal openings 101'.

The sealing members S may have a ring shape to surround (e.g., to continuously surround) the first terminal openings 101'. In an embodiment of the present disclosure, a plurality of sealing members S (e.g., first sealing members S1) may be individually respectively provided around the first terminal openings 101' to surround the first terminal openings 101', and the sealing members S (e.g., the first sealing members S1) may be respectively placed inside the guide ribs G that surround the first end portions 11 of the battery cells 10. In another embodiment of the present disclosure, a plurality of sealing members S (e.g., the first sealing members S1) may be connected to each other as a single sheet, and in this embodiment, the sealing members S (e.g., the first sealing members S1) may be concurrently (or simultaneously) aligned with the first terminal opening 101' through a single position arranging action.

Figure 5:
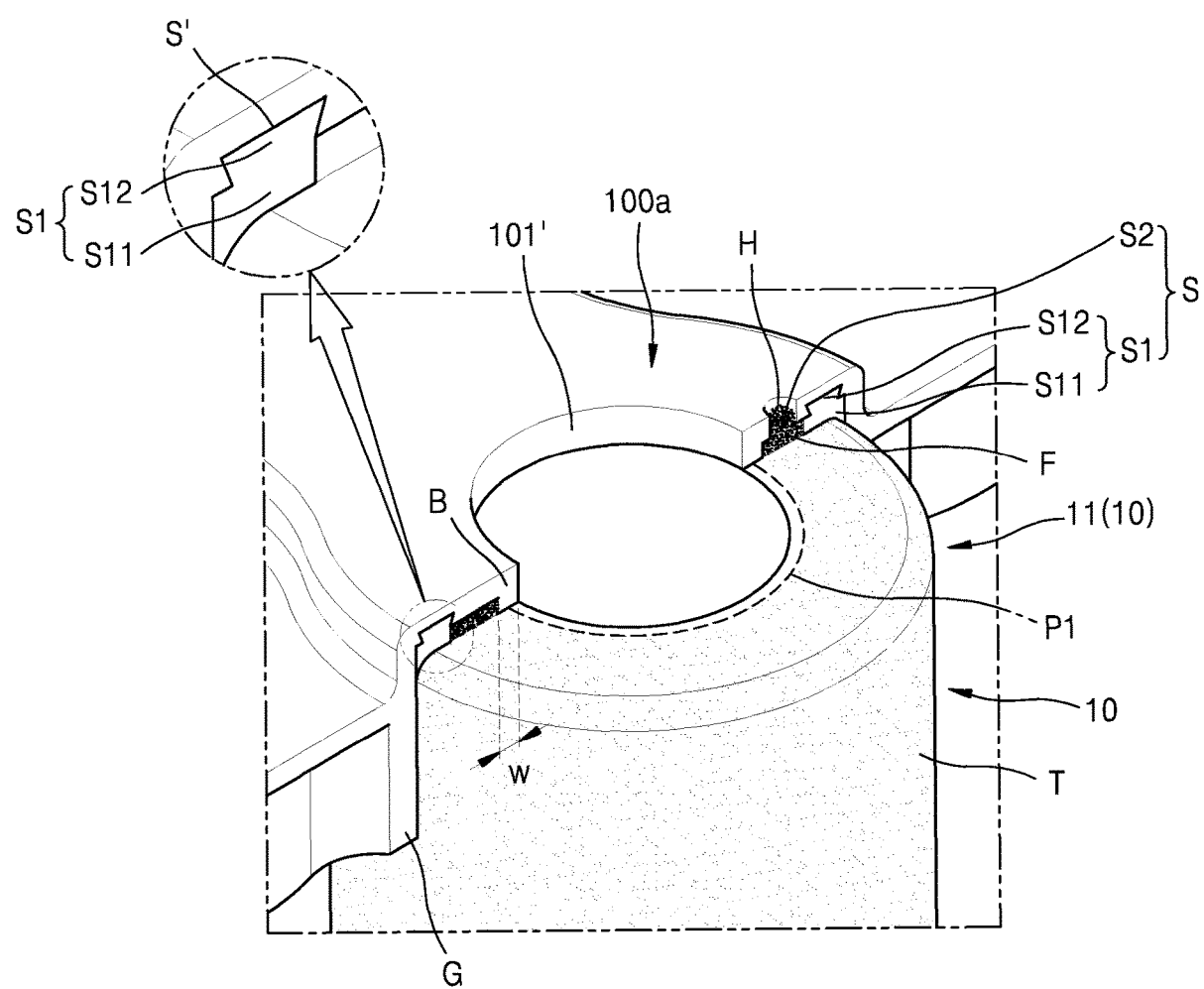
FIG. 5 is a cut-away view taken along the line V-V in FIG. 1.

FIG. 5 is a cross-sectional view taken along the line V-V of FIG. 1. Referring to FIG. 5, the sealing members S may include first and second sealing members S1 and S2 (e.g., each of the sealing members S may include the first and second sealing members S1 and S2) doubly surrounding the first terminal openings 101' from the outsides of the first terminal openings 101'. The first terminal openings 101' may be sealed by doubly surrounding the first terminal openings 101' with the first and second sealing members S1 and S2, and the first and second sealing members S1 and S2 may doubly block gaps between the first cover 100a and the first end portions 11 of the battery cells 10 from the outsides of (e.g., from the periphery of) the first terminal openings 101'.

The first and second sealing members S1 and S2 may have a ring shape to surround (e.g., to entirely or continuously surround) the first terminal openings 101'. For example, the first sealing members S1 may have a ring shape and surround the first terminal openings 101' at relatively outer positions thereof (e.g., at a peripheral area of the first terminal openings 101'), and the second sealing members S2 may have a ring shape and may surround the first terminal openings 101' at relatively inner positions (e.g., at a relatively closer peripheral area than the first sealing members S1).

The first sealing members S1 may be patterned (e.g., may have a preformed pattern) and may be formed together with the first cover 100a by an insert molding method. For example, the first sealing members S1 may include an elastic material having good sealing characteristics, and the elastic material may be a rubber material, such as ethylene propylene diene terpolymer (EPDM).

The first sealing members S1 may include protruding portions S11 protruding from the first cover 100a. The first sealing members S1 are for blocking gaps between (e.g., for sealing an area between) the first cover 100a and the first end portions 11 of the battery cells 10, and the protruding portions S11 of the first sealing members S1 may protrude from the first cover 100a and may contact the first end portions 11 of the battery cells 10. For example, the protruding portions S11 may surround (e.g., may extend entirely around) the first terminal openings 101' and may block cooling fluid from leaking through the first terminal openings 101', and to this end, the protruding portions S11 may protrude from the first cover 100a and may elastically contact the first end portions 11 of the battery cells 10 by pressure.

As described above, portions of the first sealing members S1 may be the protruding portions S11 that protrude from the first cover 100a and may contact the first end portions 11 of the battery cells 10, and the other portions of the first sealing members S1 may be buried portions S12 inserted into coupling groves S' formed in the first cover 100a for fixing the positions of the first sealing members S1. The protruding portions S11 and the buried portions S12 may adjoin each other (e.g., may be integrally formed with other or connected to each other) to form opposite sides of the first sealing members S1.

The buried portions S12 and the coupling groves S' of the first cover 100a may have complementary shapes for matching each other and may be fitted to each other with a dovetail shape to prevent unintentional separation. For example, the buried portions S12 may have a width that gradually increases in a recessed direction of the coupling grooves S', and the increasing width of the buried portions S12 in the recessed direction of the coupling grooves S' may function as stop jaws preventing unintentional separation of the first sealing members S1 from the coupling grooves S'.

The buried portions S12 may be formed by an insert molding method in a state in which the buried portions S12 are inserted in the coupling grooves S' of the first cover 100a. For example, after the first sealing members S1, including the buried portions S12 having a dovetail shape, are fixed to the inside of a mold in which a molten resin will be injected for forming the first cover 100a (e.g., an injection forming mold), the molten resin may be injected into the mold to form the first cover 100a having the coupling grooves S' matching the dovetail-shaped buried portions S12. Thus, the buried portions S12 may be buried in the coupling grooves S' of the first cover 100a and fixed in place by the dovetail-shaped buried portions.

The first and second sealing members S1 and S2 may surround (e.g., may extend entirely around) the first terminal openings 101' from the outsides of the first terminal openings 101' at different positions. For example, the first sealing members S1 may extend around the outsides of the first terminal openings 101', and the second sealing members S2 may be between the first terminal openings 101' and the first sealing members S1 in a radial direction of the first terminal openings 101' (e.g., the second sealing members S2 may be arranged between the first terminal openings 101' and the first sealing members S1). Herein, the radial direction of the first terminal openings 101' does not limit the first terminal openings 101' to a circular shape. For example, the first terminal openings 101' may have any suitable shape, such a circular shape or an elliptical shape, and the radial direction of the first terminal openings 101' may refer to a direction from the center of a first terminal opening 101' toward the outside of the first terminal opening 101'.

The second sealing members S2 may be between (e.g., may be filled between) the first terminal openings 101' and the first sealing members S1 and may include a material having fluidity variable by heating. For example, the second sealing members S2 may be a liquid or a gel similar to a liquid at an elevated temperature and may have sufficient fluidity to permeate into filling spaces F between the first terminal openings 101' and the first sealing members S1. As the second sealing members S2 cool to room temperature, the second sealing members S2 may solidify. The second sealing members S2 may include a material having fluidity variable by heat, pressure, or light (e.g., light within a particular wavelength band). For example, the fluidity of the material of the second sealing members S2 may be varied (or controlled) by various fluidity adjusting factors, such as heating, pressurizing, or irradiation with light.

The barrier ribs B may be formed along the outsides of the first terminal openings 101' to prevent permeation of the fluid second sealing members S2. For example, the barrier ribs B may protrude from the first cover 100a toward the first end portions 11 of the battery cells 10 to define the filling spaces F for the second sealing members S2 while preventing the fluid second sealing members S2 from permeating into the first terminal openings 101' through gaps between the first cover 100a and the first end portions 11 of the battery cells 10. The barrier ribs B may be formed around the outsides of the first terminal openings 101'. For example, the barrier ribs B may surround (e.g., may extend entirely around a periphery of) the first terminal openings 101' and may define the first terminal openings 101'.

In addition to defining the filling spaces F for the second sealing members S2 from the outsides of the first terminal openings 101', the barrier ribs B may also block cooling fluid from leaking through the first terminal openings 101' together with the first and second sealing members S1 and S2. For example, because the barrier ribs B provide sealing portions surrounding the first terminal openings 101' in addition to the first and second sealing members S1 and S2, a triple sealing structure may be provided at the peripheries of the first terminal openings 101'.

The filling spaces F for the second sealing members S2 may be defined between the barrier ribs B and the first sealing members S1 in the radial direction of the first terminal openings 101' and may be defined between the first cover 100a and the first end portions 11 of the battery cells 10 in a penetration direction of the first terminal openings 101'. For example, the filling spaces F for the second sealing members S2 may be have a doughnut shape around the peripheries of the first terminal openings 101'.

Injection openings (e.g., injection holes) H connected to (e.g., in communication with) the filling spaces F may be formed in the first cover 100a. For example, the injection openings H may be formed at positions between the barrier ribs B and the first sealing members S1 that form the filling spaces F. A material for forming the second sealing members S2 may be injected into the filling spaces F through the injection openings H to fill the filling spaces F and the injection openings H. For example, the material for forming the second sealing members S2 may be pressurized and injected into the filling spaces F through the injection openings H to substantially fill the entire volume of the filling spaces F.

The first and second sealing members S1 and S2 may provide a double sealing structure at positions adjacent to each other in the radial direction of the first terminal openings 101'. However, the present disclosure is not limited thereto, and the sealing structure around the terminal openings may include, for example, multiple, adjacent sealing portions having non-continuous boundaries in the radial direction of the terminal openings. Therefore, leakage of the cooling fluid through the terminal holes may be reliably prevented by the multiple sealing structure, which provides at least double sealing.

In the embodiment shown in FIG. 5, the second sealing members S2 may be injected through the injection opening H formed in the first cover 100a in a liquid or liquid-like form, different from the form of the first sealing members S1. However, the present disclosure is not limited thereto. For example, instead of forming the second sealing members S2 by filling a material through the injection openings H, the second sealing members S2 may be pre-formed (e.g., may be pre-formed in a pattern) and injection molded together with the first cover 100a (e.g., insert injection molded) or may be formed separately from the first cover 100a and may then be inserted into the first cover 100a.

The first and second sealing members S1 and S2 may be arranged around the outsides of the first terminal openings 101', and other first and second sealing members S1 and S2 may be arranged around the outsides of (e.g., the peripheries of) the second terminal openings 102'. The first and second sealing members S1 and S2 around the second terminal openings 102' may doubly block gaps between the second cover 100b and the second end portions 12 of the battery cells 10 from the outsides of the second terminal openings 102'. For example, the first sealing members S1 may have a ring shape extending along the outsides of (e.g., the peripheries of) the second terminal openings 102', and the second sealing members S2 may be filled in filling spaces F defined by the barrier ribs B surrounding the second terminal openings 102' and the first sealing members S1 provided outside the barrier ribs B. The aspects and features of the first and second sealing members S1 and S2 for sealing the second terminal openings 102' are substantially similar to or the same as the aspects and features of the first and second sealing members S1 and S2 for sealing the first terminal openings 101', and thus, descriptions thereof may not be repeated.

Figure 6A:
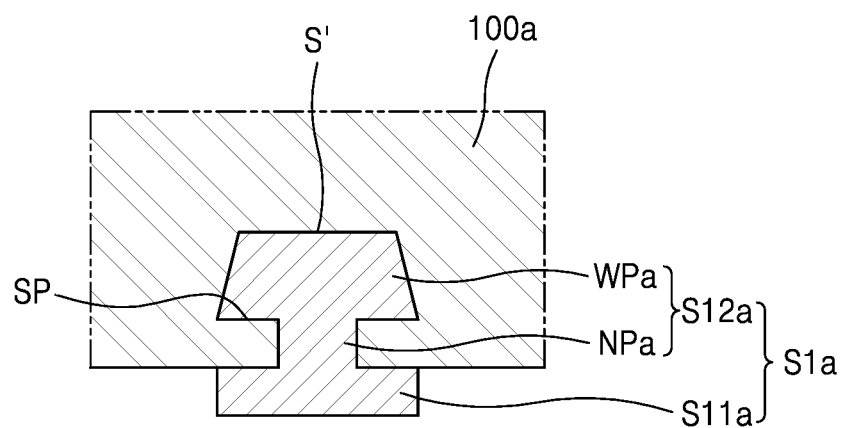
FIGS. 6A and 6B are cross-sectional views illustrating different embodiments of a first sealing member shown in FIG. 5.
Figure 6B:
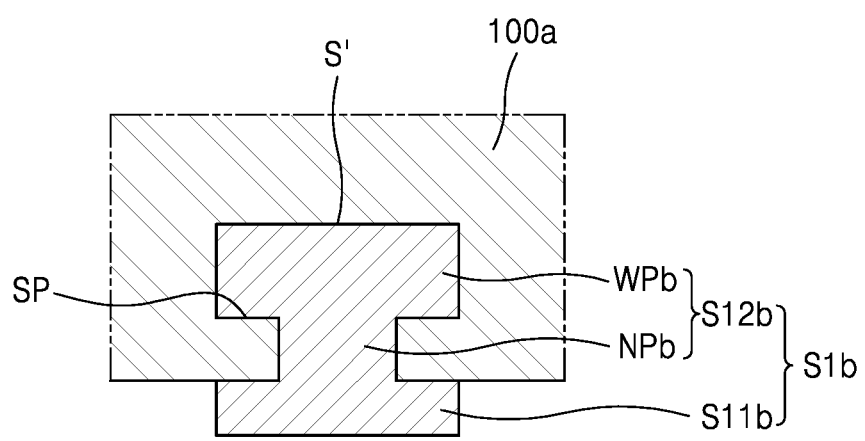

FIGS. 6A and 6B are cross-sectional views illustrating embodiments of the first sealing member S1 shown in FIG. 5.

Referring to FIGS. 6A and 6B, first sealing members S1a and S1b may respectively include portions S12a and S12b buried in the first cover 100a and protruding portions S11a and S11b extending from the buried portions S12a and S12b and protruding from the first cover 100a. The buried portions S12a and S12b may have a shape complementary to the shape of the coupling grooves S' in the first cover 100a, and at least portions of the buried portions S12a and S12b may be wider than stop jaws SP of the coupling grooves S' such that the buried portions S12a and S12b may not be unintentionally separated from the first cover 100a due to the stop jaws SP.

For example, the buried portions S12a and S12b may include narrow-width portions NPa and NPb forming bottleneck portions of the first sealing members S1a and S1b corresponding to the stop jaws SP of the coupling grooves S' and wide-width portions WPa and WPb that are wider than the narrow-width portions NPa and NPb. In the embodiments shown in FIGS. 6A and 6B, the wide-width portions WPa and WPb may have various suitable shapes, such as a trapezoidal cross-sectional shape or a rectangular cross-sectional shape, as long as the wide-width portions WPa and WPb are wider than a portion between the stop jaws SP to prevent unintentional separation of the first sealing members S1 from the stop jaws SP. The protruding portions S11a and S11b may protrude from the first cover 100a and may contact the first end portions 11 of the battery cells 10. The protruding portions S11a and S11b may be wider than the narrow-width portions NPa and NPb of the buried portions S12a and S12b to form a relatively large contact area with the first end portions 11 of the battery cells 10.

The first sealing members S1a and S1b shown in FIGS. 6A and 6B. respectively, may be formed by an injection molding method, similar the first sealing member S1 shown in FIG. 5, or may be formed separately from the first cover 100a and may then be inserted into the coupling grooves S' of the first cover 100a.

The case 100 may accommodate the battery cells 10 and the cooling fluid for cooling the battery cells 10. The cooling fluid may refer to a liquid cooling medium having higher thermal capacity and heat-dissipating performance than a gas cooling medium, such as air. The cooling fluid may flow in the accommodation space A (see, e.g., FIG. 1) while directly contacting the battery cells 10, thereby dissipating heat from the surfaces of the battery cells 10. For example, the accommodation space A (see, e.g., FIG. 1) of the case 100 may accommodate the cooling fluid directly contacting the battery cells 10, and convective heat transfer may occur due the flow of the cooling fluid around the battery cells 10 in the accommodation space A such that heat may be directly transferred from the battery cells 10.

In an embodiment of the present disclosure, the battery cells 10 may be relatively large battery cells having high output power and high capacity to provide high electrical output power, and thus, a relatively large amount of heat may be generated during charging and discharging operations of the battery cells 10. Thus, according to embodiments of the present disclosure, the cooling fluid directly contacts the battery cells 10 to dissipate heat from the battery cells 10, and because the cooling fluid has a higher heat capacity than a gas cooling medium, such as air, heat generated during operation of the battery cells 10 may be smoothly and efficiently dissipated.

In an embodiment of the present disclosure, the battery cells 10 may have a cylindrical shape with a diameter of about 21 mm or greater and a length of about 700 mm or greater. For example, heat dissipation through direct contact with the cooling fluid may effectively and smoothly dissipate heat from the cylindrical battery cells having a diameter of about 30 mm or greater and a length of about 1000 mm or greater, and thus, a high-power, high-capacity battery pack may be provided by increasing the size of battery cells 10 to increase the output power of the battery cells 10. However, the present disclosure is not limited to relatively large, cylindrical battery cells. The inventive concept of the present disclosure may be applied to other battery shapes and/or types by considering electrical output power characteristics in different applications. For example, the inventive concept may be applied to applications requiring momentarily high output power, applications involving a large amount of situation-dependent heat generation, such as battery cells having relatively high internal resistance, or applications involving battery cells in which a large amount of heat is characteristically generated.

The cooling fluid may include an electrically insulative fluid or an electrically conductive fluid, and as shown in FIG. 5, insulative layer (e.g., insulative coating) T may be provided on the outsides of (e.g., on the external surfaces other than the terminals of) the battery cells 10 that directly contact the cooling fluid. For example, in some embodiments, the surfaces of the battery cells 10 may have the same polarity as the first end portions 11 or the second end portions 12 of the battery cells 10, and the insulative layer(s) T may be formed on the surfaces of the battery cells 10 to prevent electrical interference between the battery cells 10 occurring due to the flow of the cooling fluid that transfers heat while directly contacting the battery cells 10.

As shown in FIG. 5, the insulative layers T of the battery cells 10 may be formed such that the center portions of the first end portions 11 at where electrical connection of the battery cells 10 with an external element occurs may be exposed to the outside (e.g., may be exposed by or exposed through the insulative layers T). For example, the insulative layers T may be formed on the entirety of the battery cells 10 except for the center portions of the first end portions 11 of the battery cells 10 where electrical connection is made and the center portions of the second end portions 12 of the battery cells 10 where electrical connection is made. For example, the insulative layers T may entirely surround lateral surfaces of the battery cells 10 and may end at (e.g., may not extend onto) the first and second end portions 11 and 12 of the battery cells 10. For example, end positions P1 of the insulative layers T may be on or adjacent to the first and second end portions 11 and 12, and the center portions of the first and second end portions 11 and 12 beyond the end positions P1 of the insulative layers T may be not covered with the insulative layers T but may be exposed for electrical connection.

In the following description, the end positions P1 formed on the first end portions 11 of the battery cells 10 will be primarily described. However, the following description may also be applied to the end positions P2 of the insulative layers T formed on the second end portions 12 of the battery cells 10.

Referring to FIG. 5, the end positions P1 of the insulative layers T may be between the first terminal openings 101' and the second sealing members S2 in the radial direction of the first terminal openings 101'. In some embodiments, the insulative layers T may be formed to end between the first terminal openings 101' and the second sealing members S2.

If the insulative layers T extend to the insides of the first terminal openings 101' and cover the center portions of the first end portions 11 of the battery cells 10, the insulative layers T may interfere with an electrical connection of the battery cells 10 and an external component, and if the insulative layers T are not formed up to positions where the permeation of the cooling fluid is doubly blocked by the first and second sealing members S1 and S2, the cooling fluid may directly contact the battery cells 10 due to a leak, resulting in electrical inference.

The end positions P1 of the insulative layers T may be between the first terminal openings 101' and the second sealing members S2. In an embodiment of the present disclosure, the end positions P1 of the insulative layers T may be located within the thickness (w) of the barrier ribs B corresponding to regions between the first terminal openings 101' and the second sealing members S2. For example, because the barrier ribs B have inner sides surrounding the first terminal openings 101' and outer sides contacting the second sealing members S2, the end positions P1 of the insulative layers T may be within the thickness (w) of the barrier ribs B between the inner and outer sides of the barrier ribs B.

Figure 7:
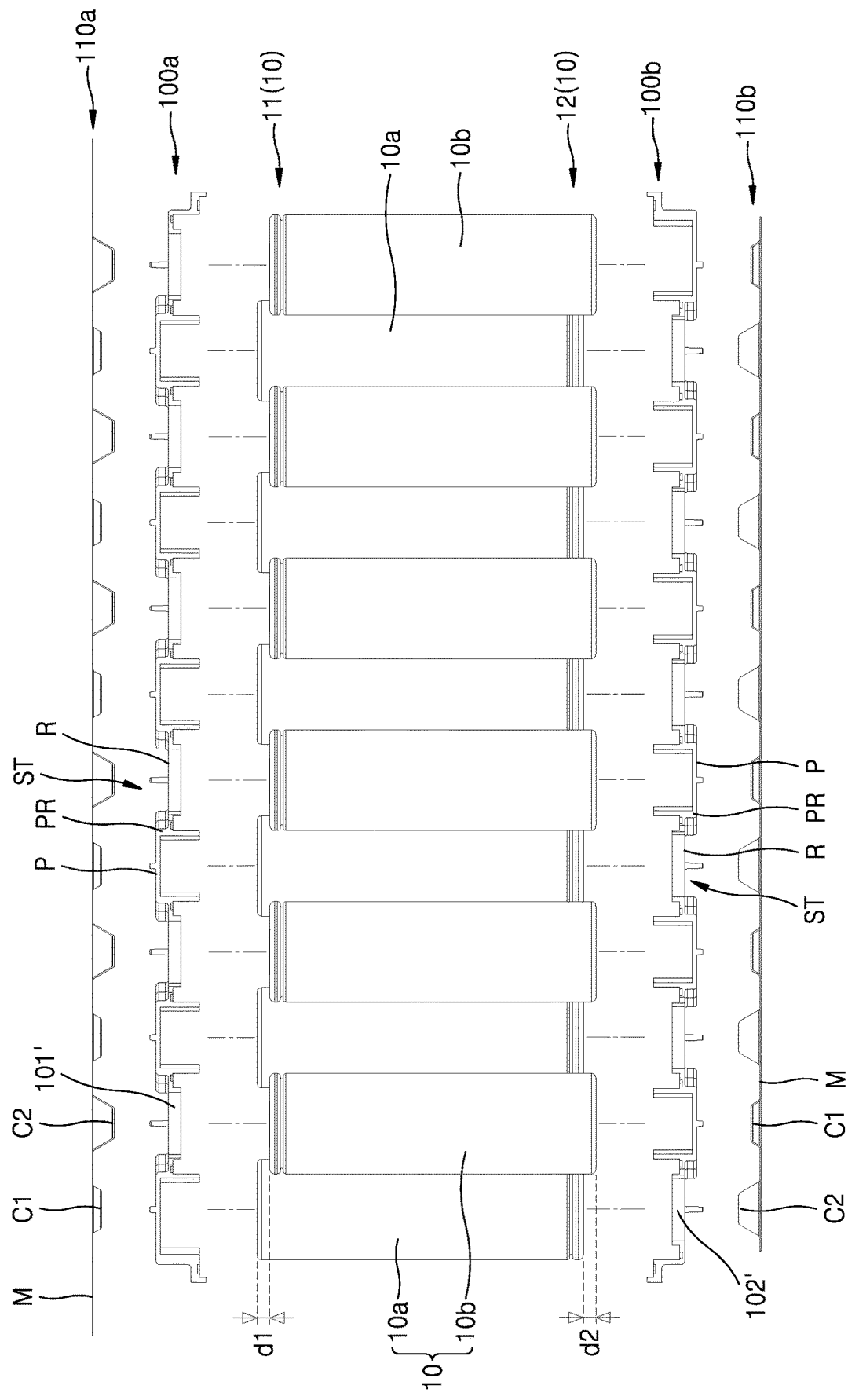
FIG. 7 is a view illustrating an arrangement of battery cells shown in FIG. 1.

FIG. 7 is a view illustrating an arrangement of the battery cells 10 shown in FIG. 1.

Referring to FIG. 7, the battery cells 10 may include first and second battery cells 10a and 10b that are arranged at offset levels in the length direction of the first and second battery cells 10a and 10b. In this embodiment, the first and second battery cells 10a and 10b may have first end portions 11 adjacent to each other and second end portions 12 adjacent to each other and located opposite the first end portions 11. The first and second end portions 11 and 12 may have height differences d1 and d2. In this embodiment, the first end portions 11 may refer to end portions of the battery cells 10 facing the first cover 100a, and the second end portions 12 may refer to the other end portions of the battery cells 10 facing the second cover 100b.

Because the first and second battery cells 10a and 10b have the same length but are arranged at offset levels in the length direction of thereof, a height difference d1 between the first end portions 11 adjacent to each other may be equal to the height difference d2 between the second end portions 12 adjacent to each other and the first and second battery cells 10a and 10b may be stepped in opposite directions. Therefore, the first battery cells 10a having relatively protruding first end portions 11 may have relatively recessed second end portions 12, and the second battery cells 10b having relatively recessed first end portions 11 may have relatively protruding second end portions 12. That is, when the first end portions 11 of the first battery cells 10a protrude outwardly more than the first end portions 11 of the second battery cells 10b, the second end portions 12 of the first battery cells 10a may be recessed inwardly more than the second end portions 12 of the second battery cells 10b by the protruding amount of the first end portions 11 of the first battery cells 10a.

For example, the height difference d1 between the adjacent first end portions 11 of the first and second battery cells 10a and 10b and the height difference d2 between the adjacent second end portions 12 of the first and second battery cells 10a and 10b may be within a range of about 3 mm to about 12 mm, for example, within the range of about 4 mm to about 10 mm. As described in more detail below, the height difference d1 between the adjacent first end portions 11 and the height difference d2 between the adjacent second end portions 12 may be within the range of about 3 mm or greater, for example, within the range of about 4 mm or greater, to guarantee sufficient emission passage. In this embodiment, the height difference d1 between the adjacent first end portions 11 and the height difference d2 between the adjacent second end portions 12 may be about 12 mm or less, for example, about 10 mm or less, to prevent a decrease in the energy density of the battery pack caused by excessive height differences d1 and d2.

The first and second battery cells 10a and 10b may be substantially the same as the battery cells 10 described above but may be arranged to reverse the polarities of the first and second end portions 11 and 12. For example, the first end portions 11 of the first and second battery cells 10a and 10b may have electrically opposite polarities, and the second end portions 12 of the first and second battery cells 10a and 10b may have electrically opposite polarities. In this embodiment, because the first and second battery cells 10a and 10b are arranged such that the first and second end portions 11 and 12 may have opposite polarities and may be at offset levels, the first end portions 11 of the first and second battery cells 10a and 10b may have electrically opposite polarities and may be spatially separated by the height difference d1, and similarly, the second end portions 12 of the first and second battery cells 10a and 10b that are adjacent to each other at a side opposite the first end portions 11 may have electrically opposite polarities and may be spatially separated by the height difference d2.

Referring to FIGS. 1 and 7, the first cover 100a may be placed on the first end portions 11 of the first and second battery cells 10a and 10b to cover the first end portions 11, and the second cover 100b may be placed on the second end portions 12 of the first and second battery cells 10a and 10b to cover the second end portions 12. In this embodiment, the first cover 100a may have height difference spaces ST on an outer side of the first cover 100a by extending along the height differences d1 between the first end portions 11 of the first and second battery cells 10a and 10b, and similarly, the second cover 100b may have other height difference spaces ST on an outer side of the second cover 100b by extending along the height differences d2 between the second end portions 12 of the first and second battery cells 10a and 10b.

In the following description, the height difference spaces ST formed on the outer side of the first cover 100a will be primarily described, but the description of the height difference spaces ST may apply to the height difference spaces ST formed on the outer side of the second cover 100b.

Referring to FIGS. 1 and 7, the first cover 100a may include: protruding portions P and recessed portions R that cover the first end portions 11 of the first and second battery cells 10a and 10b at different levels; and stepped portions PR extend between the height differences d1 between the first end portions 11 of the first and second battery cells 10a and 10b. In addition, the height difference spaces ST corresponding to the height differences d1 between the first end portions 11 of the first and second battery cells 10a and 10b may be formed on outer sides of the recessed portions R.

In an embodiment of the present disclosure, the protruding portions P may be relatively high protruding portions to cover the first end portions 11 of the first battery cells 10a that relatively protrude above the first end portions 11 of the second battery cells 10b, and the recessed portions R may be a relatively low recessed portions to cover the first end portions 11 of the second battery cells 10b that are relatively recessed below the first end portions 11 of the first battery cells 10a. In addition, the stepped portions PR may connect the protruding portions P and the recessed portions R to each other (e.g., may extend between the protruding portions P and the recessed portions R) while extending along the height differences d1 between the first end portions 11 of the first and second battery cells 10a and 10b. In this embodiment, the height difference spaces ST may be formed on the outer sides of the recessed portions R at a relatively low level.

In the embodiment of the present disclosure shown in FIG. 1, the first and second battery cells 10a and 10b may be arranged in rows, and rows of the first battery cells 10a and rows of the second battery cells 10b may be arranged side by side at neighboring positions. In an embodiment of the present disclosure, the first and second battery cells 10a and 10b may be cylindrical battery cells and may be arranged such that the first battery cells 10a may be placed in valleys between neighboring (e.g., adjacent) ones of the second battery cells 10b, and the second battery cells 10b may be placed in valleys between neighboring (e.g., adjacent) ones of the first battery cells 10a, thereby decreasing unnecessary space and increasing the energy density of the battery pack.

The protruding portions P of the first cover 100a may be formed along the rows of the first battery cells 10a having the first end portions 11 that relatively protrude and may include first terminal openings 101' for electrical connection with the first battery cells 10a. The recessed portions R of the first cover 100a may be formed along the rows of the second battery cells 10b having the first end portions 11 that are relatively recessed and may include first terminal openings 101' for electrical connection with the second battery cells 10b. Because the height difference spaces ST are formed at the outer sides (e.g., at the outer edges or the periphery) of the recessed portions R, the height difference spaces ST may be formed in the shape of channels N (see, e.g., FIG. 1) extending across the first cover 100a along the rows of the second battery cells 10b.

The height difference spaces ST of the first cover 100a may provide emission passages for discharging emission gas from the battery cells 10. For example, the height difference spaces ST of the first cover 100a may be formed on the outer sides of the recessed portions R and may be connected (e.g., may be in communication) through the first terminal openings 101' to the first end portions 11 of the second battery cells 10b that are relatively recessed at inner sides of the recessed portions R, thereby providing emission passages for discharging emission gas from the first end portions 11 of the second battery cells 10b.

Figure 8:
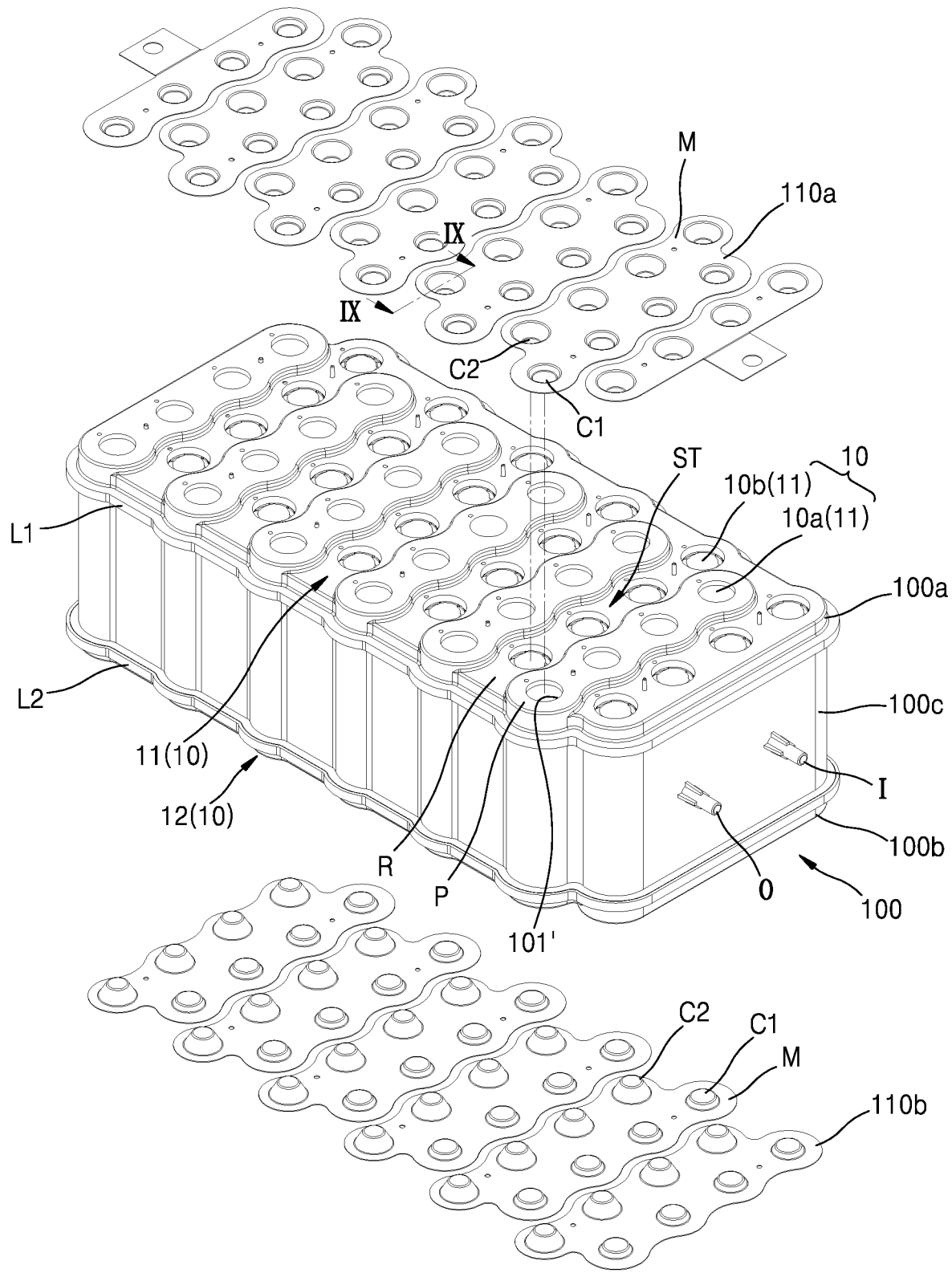
FIG. 8 is an exploded perspective view illustrating height difference spaces of the battery pack shown in FIG. 1.
Figure 9:
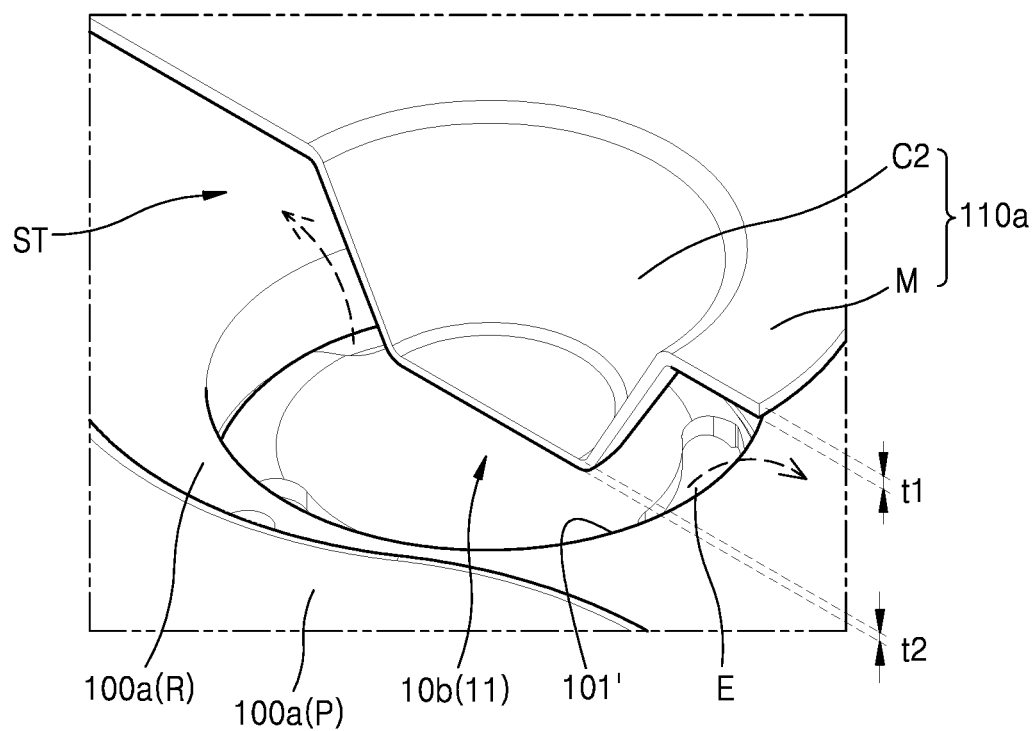
FIG. 9 is a cut-away view taken along the line IX-IX in FIG. 8 for illustrating how gas is discharged from a battery cell through one of the height difference spaces.

FIG. 8 is a perspective view illustrating the height difference spaces ST of the battery pack shown in FIG. 1, and FIG. 9 is a cut-away view taken along the line IX-IX in FIG. 8 illustrating how gas is discharged from a battery cell 10 through a height difference space ST.

Referring to FIG. 8, a first tab plate 110a is electrically connected to the first end portions 11 of the first and second battery cells 10a and 10b and may be placed on the first cover 100a. Referring to FIG. 9, the first tab plate 110a may be connected to the first end portion 11 of one of second battery cells 10b through a height difference space ST of the first cover 100a and a first terminal opening 101'. In this embodiment, emission openings (e.g., emission holes) E may be formed around a center portion of the first end portion 11 of the second battery cell 10b that is coupled to the first tab plate 110a. In addition, the emission openings E and the center portion of the first end portion 11 may be exposed through the first terminal opening 101', and the first terminal opening 101' may have a sufficiently large size (e.g., a relatively large diameter) to expose all the emission openings E and the center portion of the first end portion 11.

The emission openings E may be connected through the first terminal opening 101' to the height difference space ST formed on the outer side of the first cover 100a. For example, emission gas discharged through the first terminal opening 101' may be guided to the outside (e.g., to the outside of the case 100) through the height difference space ST between the first cover 100a (e.g., a recessed portion R of the first cover 100a) and the first tab plate 110a, and because the height difference space ST provides an emission passage connected to (e.g., in communication with) the first terminal opening 101', the height difference space ST may be considered as being located between the first cover 100a (e.g., the recessed portion R of the first cover 100a) and the first tab plate 110a. In addition, the first end portion 11 of the second battery cell 10b, in which the emission openings E are formed, may be a positive electrode side (e.g., may be a positive electrode terminal).

Referring to FIG. 7, similar to the first cover 100a, the second cover 100b may extend along the height difference d2 between the second end portions 12 of the first and second battery cells 10a and 10b while covering the second end portions 12 of the first battery cells 10a and the second end portions 12 of the second battery cells 10b. Therefore, the height difference spaces ST corresponding to the height difference d2 between the second end portions 12 may be formed on the outer side of the second cover 100b. In this embodiment, the height difference spaces ST may be formed on the second end portions 12 of the first battery cells 10a and may be relatively recessed to have a sunken shape.

The height difference spaces ST of the second cover 100b may provide emission passages for the discharge of emission gas from the battery cells 10. For example, the height difference spaces ST of the second cover 100b may be connected (e.g., may be in communication) through the second terminal openings 102' to the second end portions 12 of the first battery cells 10a that are relatively recessed to have a sunken shape at an inner side of the second cover 100b and may provide emission passages for the discharge of emission gas from the second end portions 12 of the first battery cells 10a. In this embodiment, other emission openings (e.g., other emission holes) E may be formed in the second end portions 12 of the first battery cells 10a to discharge emission gas accumulated in the first battery cells 10a, and the second end portions 12 of the first battery cells 10a may be positive electrode sides (e.g., positive electrode terminals) in which the emission holes E are formed.

As described above, the height difference spaces ST of the first cover 100a may provide emission passages to discharge emission gas from the second battery cells 10b, and the height difference spaces ST of the second cover 100b may provide emission passages to discharge emission gas from the first battery cells 10a. Therefore, emission passages for the first and second battery cells 10a and 10b may be provided by the height difference spaces ST of the first cover 100a and/or the height difference spaces ST of the second cover 100b.

In an embodiment of the present disclosure, the first and second battery cells 10a and 10b are arranged adjacent to each other at offset levels to form the height difference d1 between the first end portions 11 and the height difference d2 between the second end portions 12 of the first and second battery cells 10a and 10b. The height difference spaces ST are formed on the first end portions 11 or the second end portions 12 that are relatively recessed to have a sunken shape to provide emission passages such that emission gas discharged through the relatively recessed first end portions 11 or the relatively recessed second end portions 12 may be discharged to the outside (e.g., to the outside of the case 100) through the height difference spaces ST. In this embodiment, the emission openings E may be formed in the relatively recessed first end portions 11 and/or the relatively recessed second end portions 12. In an embodiment of the present disclosure, the relatively recessed first end portions 11 of the second battery cells 10b and the relatively recessed second end portions 12 of the first battery cells 10a in which the emission openings E are formed may be the positive electrode sides (e.g., the positive electrode terminals), and the first end portions 11 of the first battery cells 10a and the second end portions 12 of the second battery cells 10b that relatively protrude in a projecting shape may be the negative electrode sides (e.g., the negative electrode terminals).

Figure 10:
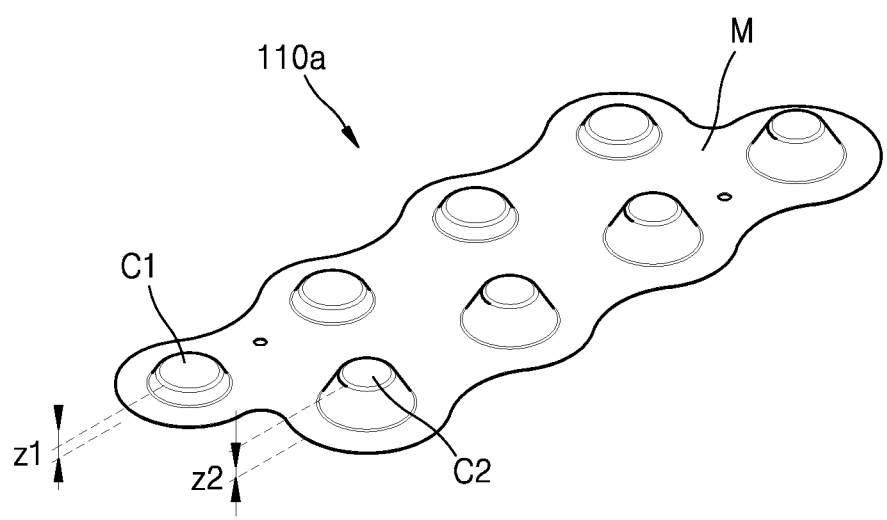
FIG. 10 is a perspective view illustrating a first tab plate shown in FIG. 8.

FIG. 10 is a perspective view illustrating the first tab plate 110a shown in FIG. 8.

Referring to FIGS. 8 and 10, the first tab plate 110a for electrically connecting the first end portions 11 of the first and second battery cells 10a and 10b may be placed on the outer side of the first cover 100a. The first tab plate 110a may include a main boy M having a flat shape that is configured to be placed on the first cover 100a and first and second contact portions C1 and C2 protruding toward the first end portions 11 of the first and second battery cells 10a and 10b with different protruding depths (e.g., the first and second contact portions C1 and C2 have different protruding depths, or heights, from each other).

The main portion M has a flat (or substantially flat) shape and may be placed on the first cover 100a to extend along the first cover 100a. The main portion M may be fixed to a position on the first cover 100a owing to the first and second contact portions C1 and C2, which are respectively coupled to the first end portions 11 of the first and second battery cells 10a and 10b.

The first and second contact portions C1 and C2 may contact the first end portions 11 of the first and second battery cells 10a and 10b that are exposed through the first terminal openings 101' and may have sufficient depths to reach (e.g., to contact) the first end portions 11 of the first and second battery cells 10a and 10b.

The first contact portions C1 may extend from the main portion M, which is placed on the first cover 100a, and may be coupled to (e.g., may contact) the relatively protruding first end portions 11 of the first battery cells 10a through the first terminal openings 101' formed in the first cover 100a (e.g., formed in the protruding portions P). The second contact portions C2 may extend from the main portion M, which is placed on the first cover 100a, and may be coupled to (e.g., may contact) the relatively recessed first end portions 11 of the second battery cells 10b through the height difference spaces ST formed on the outer side of the first cover 100a (e.g., formed on the outer sides of the recessed portions R of the first cover 100a) and the first terminal openings 101'. As described above, the first and second contact portions C1 and C2 may protrude from the main portion M to different depths from each other and may be coupled to (e.g., may contact) the relatively protruding first end portions 11 of the first battery cells 10a and the relatively recessed first end portions 11 of the second battery cells 10b. And, as shown in FIG. 10, the protruding depth z2 of the second contact portions C2 may be greater than the protruding depth z1 of the first contact portions C1.

The first and second contact portions C1 and C2 are not in the same plane as the main portion M and protrude from the main portion M to different depths such that the first and second contact portions C1 and C2 may contact the first end portions 11 of the first and second battery cells 10a and 10b that have step height differences with each other. The first and second contact portions C1 and C2 protrude from the main portion M, which is placed on the first cover 100a, to sufficient depths to pass through the first terminal openings 101' to contact the first end portions 11 of the first and second battery cells 10a and 10b.

Each of the first and second contact portions C1 and C2 may have a truncated cone shape having a cross-sectional area that decreases in proportion to the protruding depth such that the first and second contact portions C1 and C2 may have gradually decreasing radii in proportion to the protruding depths and may, thus, be coupled to the first end portions 11 of the first and second battery cells 10a and 10b at an area having a minimal radii. Because the first and second contact portions C1 and C2 have decreasing cross-sectional radii in proportion to the protruding depths from the main portion M and are coupled to the center portions of the first end portions 11 of the first and second battery cells 10a and 10b at an area where the first and second contact portions C1 and C2 have minimal radii, the formation of emission passages may be provided by the emission openings E (see, e.g., FIG. 9) formed around the center portions of the first end portions 11.

The first and second contact portions C1 and C2 may be thinner than the main portion M. The first and second contact portions C1 and C2 may be welded to the first end portions 11 of the first and second battery cells 10a and 10b, and the first and second contact portions C1 and C2 may have a relatively thin thickness to be sufficiently melted to improve welding strength. The first and second contact portions C1 and C2 may be formed by a forging process or a press forming process in which portions of a raw-material metal sheet are extended (or formed) downward and may have a relatively thin thickness because the raw-material metal sheet is extended. For example, as shown in FIG. 9, the minimal radius portions of the second contact portions C2 to be welded to the first end portions 11 of the second battery cells 10b may have a second thickness t2 that is less than a first thickness t1 of the main portion M. The first thickness t1 of the main portion M may be relatively large to provide reduced resistance for charging and discharging currents. For example, the first thickness t1 may be about 1 mm or greater, and the second thickness t2 may be about 0.4 mm or greater. The second thickness t2 may have a minimum thickness of about 0.4 mm to ensure bonding to the first end portions 11 of the second battery cells 10b through welding while maintaining the protruded shape, and the first thickness t1 may have a minimum thickness of about 1 mm to provide the second thickness of about 0.4 mm after the forging process or the press forming process. In an embodiment of the present disclosure, the first thickness t1 may be 1 mm, and the second thickness t2 may be 0.4 mm.

Referring to FIG. 10, the plurality of first contact portions C1 and the plurality of second contact portions C2 may be arranged on the main portion M in rows. In the embodiment of the present disclosure shown in FIG. 8, the first tab plate 110a may connect a row of first battery cells 10a and an adjacent row of second battery cells 10b to each other in such a manner that the first end portions 11 of the first battery cells 10a having the same polarity as each other may be connected in parallel to each other and the first end portions 11 of the second battery cells 10b having the same polarity as each other may be connected in parallel to each other while the first end portions 11 of the first and second battery cells 10a and 10b having opposite polarities as each other are connected in series to each other. To connect the battery cells 10a and 10b in series-parallel using the first tab plate 110a as described above, the first tab plate 110a may include a plurality of first contact portions C1 and a plurality of second contact portions C2 to be connected to the first and second battery cells 10a and 10b, and the first and second contact portions C1 and C2 may be arranged in rows according to the rows of the first and second battery cells 10a and 10b.

Referring to FIG. 8, a second tab plate 110b for electrically connecting the second end portions 12 of the first and second battery cells 10a and 10b may be placed on the second cover 100b. Similar to the first tab plate 110a, the second tab plate 110b may include a main portion M configured to be placed on the second cover 100b and first and second contact portions C1 and C2 protruding from the main portion M to different depths from each other.

The second tab plate 110b may connect the second end portions 12 of the first battery cells 10a having the same polarity as each other to each other in parallel, the second end portions 12 of the second battery cells 10b having the same polarity as each other to each other in parallel, and the second end portions 12 of the first and second battery cells 10a and 10b having different polarities from each other to each other in series. To this end, the plurality of first contact portions C1 and the plurality of second contact portions C2 configured to be respectively connected to the first and second battery cells 10a and 10b may be formed on the second tab plate 110b.

Figure 11:
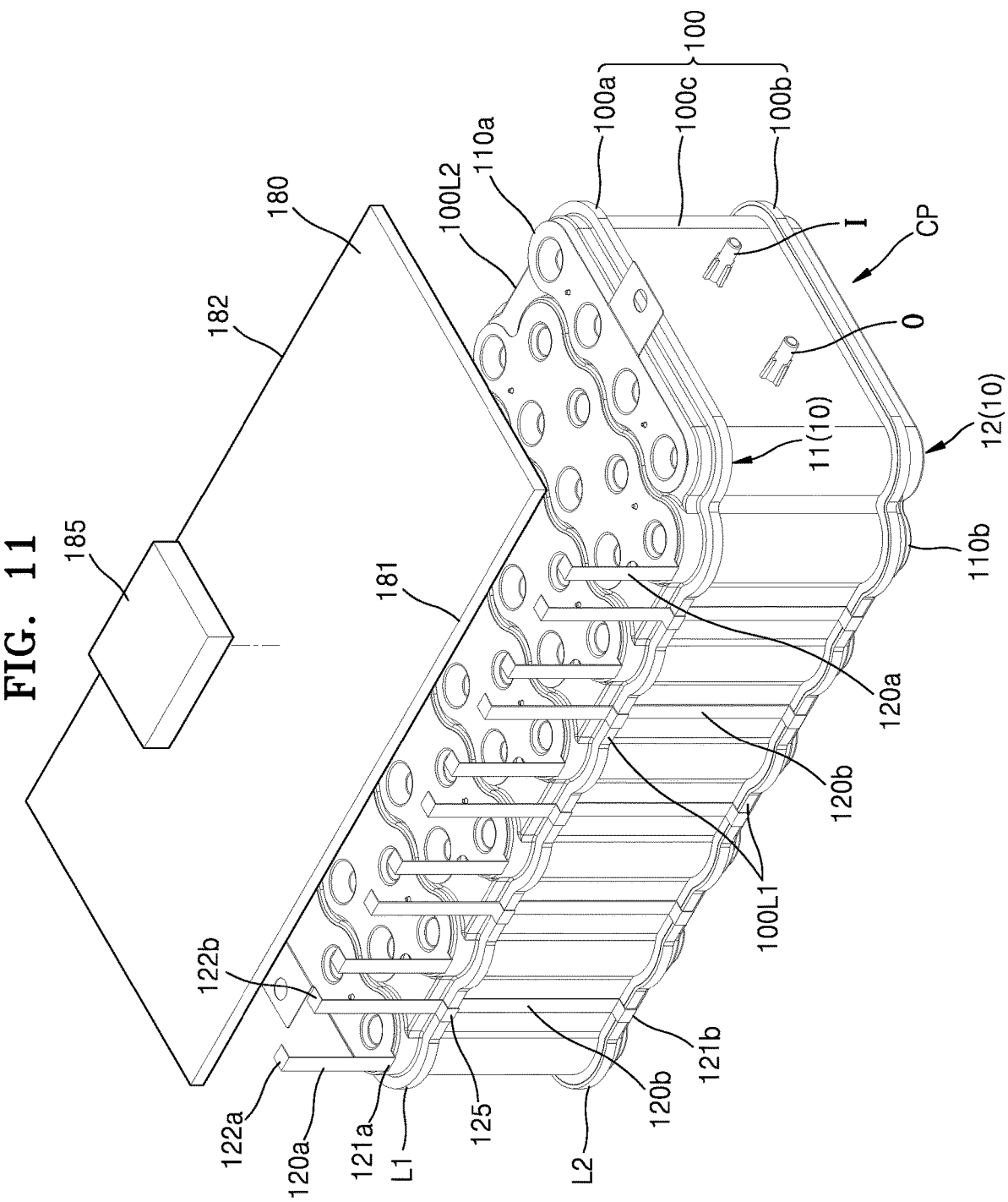
FIG. 11 is a partially-exploded perspective view illustrating connection structures of first and second tab plates shown in FIG. 8.

FIG. 11 is a view illustrating connection structures of the first and second tab plates 110a and 110b shown in FIG. 8.

Referring to FIG. 11, the first tab plate 110a may be placed on the first cover 100a to electrically connect the first end portions 11 of the battery cells 10, and the second tab plate 110b may be placed on the second cover 100b to electrically connect the second end portions 12 of the battery cells 10. A circuit board 180 may be placed on the first tab plate 110a, and the first and second tab plates 110a and 110b may be connected to the circuit board 180. To this end, a first lead 120a may be provided between the circuit board 180 and the first tab plate 110a for electrical connection therebetween, and a second lead 120b may be provided between the circuit board 180 and the second tab plate 110b for electrical connection therebetween. State information about the battery cells 10, such as voltage information, may be transmitted from the first and second tab plates 110a and 110b to the circuit board 180 through the first and second leads 120a and 120b, and the circuit board 180 may use the information for controlling charging and discharging operations of the battery cells 10.

The circuit board 180 is placed on the first tab plate 110a and is, thus, relatively close to the first tab plate 110a and relatively distant from the second tab plate 110b. Therefore, the second lead 120b may extend longer than the first lead 120a. For example, because the second lead 120b extends from the second tab plate 110b, which is placed on the second cover 100b, to the circuit board 180, which is placed above the first cover 100a, the second lead 120b may be longer than the first lead 120a. In this embodiment, the second lead 120b may include bent portions 125 such that the second lead 120b may pass by the first and second laser weld zones L1 and L2 while extending across a lateral side of the case 100. Owing to the bent portions 125, the second lead 120b may extend while making close contact with the lateral side of the case 100 without physically interfering with the first and second laser weld zones L1 and L2, which protrude from the lateral side of the case 100. Thus, the second lead 120b may be stably supported and may not short-circuit with the first lead 120a, which could occur if the second lead 120b were to unstably come off of (e.g., become separated from) the lateral side of the case 100.

The first and second leads 120a and 120b may be formed separately from the first and second tab plates 110a and 110b and may then be welded to the first and second tab plates 110a and 110b, respectively. For example, coupling portions 121a and 121b may be formed on respective ends of the first and second leads 120a and 120b for coupling with the first and second tab plates 110a and 110b, and connection portions 122a and 122b may be formed on the other ends of the first and second leads 120a and 120b for connection with the circuit board 180. In an embodiment of the present disclosure, the coupling portions 121a and 121b respectively formed on the ends of the first and second leads 120a and 120b, and the connection portions 122a and 122b respectively formed on the other ends of the first and second leads 120a and 120b may each be welding portions.

In another embodiment, the first and second leads 120a and 120b may be respectively formed in one piece with (e.g., may be integrally formed with) the first and second tab plates 110a and 110b, different from the above-described embodiment in which the first and second leads 120a and 120b are formed separately from the first and second tab plates 110a and 110b. When the first and second leads 120a and 120b are respectively formed in one piece with the first and second tab plates 110a and 110b, however, material costs may increase due to metal scrap remaining after a base metal sheet cutting process. For example, when the second lead 120b, which is relatively long, is formed in one piece with the second tab plate 110b, a relatively large amount of metal scrap may remain, and thus, material costs may excessively increase. In addition, when a bending process is performed on the second lead 120b independently of the second tab plate 110b, the bending process may be easily performed. Therefore, at least the second lead 120b may be formed separately from the second lead 120b.

In another embodiment of the present disclosure, the first lead 120a, which has a relatively short length, may extend from the first tab plate 110a after being bent (e.g., continuously bent) from the first tab plate 110a, and the second lead 120b, which has a relatively long length, may be formed separately from the second tab plate 110b and may then be welded to the second tab plates 110b.

A plurality of first leads 120a may respectively extend from a plurality of first tab plates 110a. Similarly, a plurality of second leads 120a may respectively extend from a plurality of second tab plates 110b. The first and second leads 120a and 120b may be arranged in an alternating pattern such that the first leads 120a may be placed between two neighboring (or adjacent) second leads 120b, and the second leads 120b may be placed between two neighboring (or adjacent) first leads 120a. As described above, because the first and second leads 120a and 120b are arranged in an alternating pattern, electrical interference between the first and second leads 120a and 120b may be prevented, and the first and second leads 120a and 120b may be electrically insulated from each other.

The first and second leads 120a and 120b may be closely (or intensively) arranged along first long-side portions 100L1 of the first and second covers 100a and 100b. For example, when the first and second covers 100a and 100b include opposite first and second long-side portions 100L1 and 100L2, the first and second leads 120a and 120b may be closely arranged along the first long-side portions 100L1 of the first and second covers 100a and 100b and may not be arranged on the second long-side portions 100L2 opposite the first long-side portions 100L1. In this embodiment, the first long-side portions 100L1 of the first and second covers 100a and 100b may contact the same lateral side of the case 100, for example, the same lateral side of the middle case 100c.

In an embodiment of the present disclosure, the coupling portions 121a and 121b formed on the ends of the first and second leads 120a and 120b and the connection portions 122a and 122b formed on the other ends of the first and second leads 120a and 120b may each be welding portions, for example, laser welding portions. In this embodiment, because the first and second leads 120a and 120b are closely arranged along the first long-side portions 100L1 of the first and second covers 100a and 100b, laser welding workability may be improved, and a laser beam emission position may not be changed from the first long-side portions 100L1 to the second long-side portions 100L2 and/or the positions of the first and second covers 100a and 100b may not be changed during a laser welding process.

In an embodiment of the present disclosure, the first tab plates 110a may connect, in series, the first end portions 11 of the first and second battery cells 10a and 10b having opposite polarities, and the second tab plates 110b may connect, in series, the second end portions 12 of the first and second battery cells 10a and 10b having opposite polarities. In this embodiment, the first and second tab plates 110a and 110b may be arranged in a zigzag pattern on the first and second covers 100a and 100b to connect different pairs of the first and second battery cells 10a and 10b to each other, and thus, the first and second leads 120a and 120b extending from the first and second tab plates 110a and 110b may also be arranged in an alternating pattern. For example, the first and second tab plates 110a and 110b may be alternately arranged along the first long-side portions 100L1 of the first and second covers 100a and 100b, and the first and second leads 120a and 120b, which extend from the first and second tab plates 110a and 110b, may be alternately arranged along the first long-side portions 100L1 of the first and second covers 100a and 100b.

Because the first and second leads 120a and 120b are arranged along the first long-side portions 100L1 of the first and second covers 100a and 100b, the connection portions 122a and 122b, which are end portions of the first and second leads 120a and 120b, may be connected to a first side portion 181 of the circuit board 180. For example, the connection portions 122a and 122b of the first and second leads 120a and 120b may be arranged in a row along the first side portion 181 of the circuit board 180. For example, the connection portions 122a and 122b of the first and second leads 120a and 120b may be arranged in one direction along the first side portion 181 of the circuit board 180 without overlapping each other (e.g., the connection portions 122a and 122b of the first and second leads 120a and 120b may be arranged in a single row in one direction). Here, the first side portion 181 of the circuit board 180 may correspond to (or may be) an edge portion of the circuit board 180 that extends straight (e.g., straight and continuously) in one direction and may not include edge portions extending in different directions. In an embodiment of the present disclosure, the first and second leads 120a and 120b may be closely connected to the first side portion 181 of the circuit board 180 and may not be connected to a second side portion 182 of the circuit board 180 opposite the first side portion 181.

As described above, because the connection portions 122a and 122b of the first and second leads 120a and 120b are closely connected to the first side portion 181 of the circuit board 180, a conduction path of the circuit board 180 connected to the first and second leads 120a and 120b may be shortened. For example, the conduction path may be shortened by placing a circuit for processing data transmitted through the first and second leads 120a and 120b at a position close to the first side portion 181 of the circuit board 180.

The connection portions 122a and 122b of the first and second leads 120a and 120b may be arranged in an alternating pattern along the first side portion 181 of the circuit board 180. Because the first and second leads 120a and 120b are arranged in an alternating pattern, the connection portions 122a and 122b forming end portions of the first and second leads 120a and 120b may be arranged in an alternating pattern along the first side portion 181 of the circuit board 180.

The circuit board 180 may receive information about states of the battery cells 10 through the first and second leads 120a and 120b and may control charging and discharging operations of the battery cells 10 based on the state information. The circuit board 180 may be provided on the first tab plates 110a on a side of the first cover 100a. For example, the circuit board 180 may be provided on a side of the first cover 100a instead of being provided on a side of the middle case 100c.

The first tab plates 110a may be directly connected to the first end portions 11 of the battery cells 10, which contact the cooling fluid, and the first tab plates 110a may be in thermal contact with the cooling fluid through the first cover 100a, with which the first tab plates 110a makes tight contact. Thus, the circuit board 180, which is placed on the first tab plates 110a, may be cooled through the first tab plates 110a.

Similar to the first tab plates 110a, the second tab plates 110b may be directly connected to the second end portions 12 of the battery cells 10 that contact the cooling fluid, and the second tab plates 110b may be in thermal contact with the cooling fluid through the second cover 100b, with which the second tab plates 110b make tight contact. As described above, according to embodiments of the present disclosure, heat may be intensively generated at the first and second tab plates 110a and 110b due to concentration of charging and discharging currents, and the first and second tab plates 110a and 110b may be cooled by the cooling fluid flowing in the case 100. Therefore, the temperature of the first and second tab plates 110a and 110b may be lowered to decrease the electrical resistance of charging and discharging passages, and circuit components mounted on the circuit board 180 may be cooled through the first tab plates 110a. According to an embodiment of the present disclosure, an insulative member may be placed between the first tab plates 110a and the circuit board 180 to provide electrical insulation therebetween.

Figure 12:
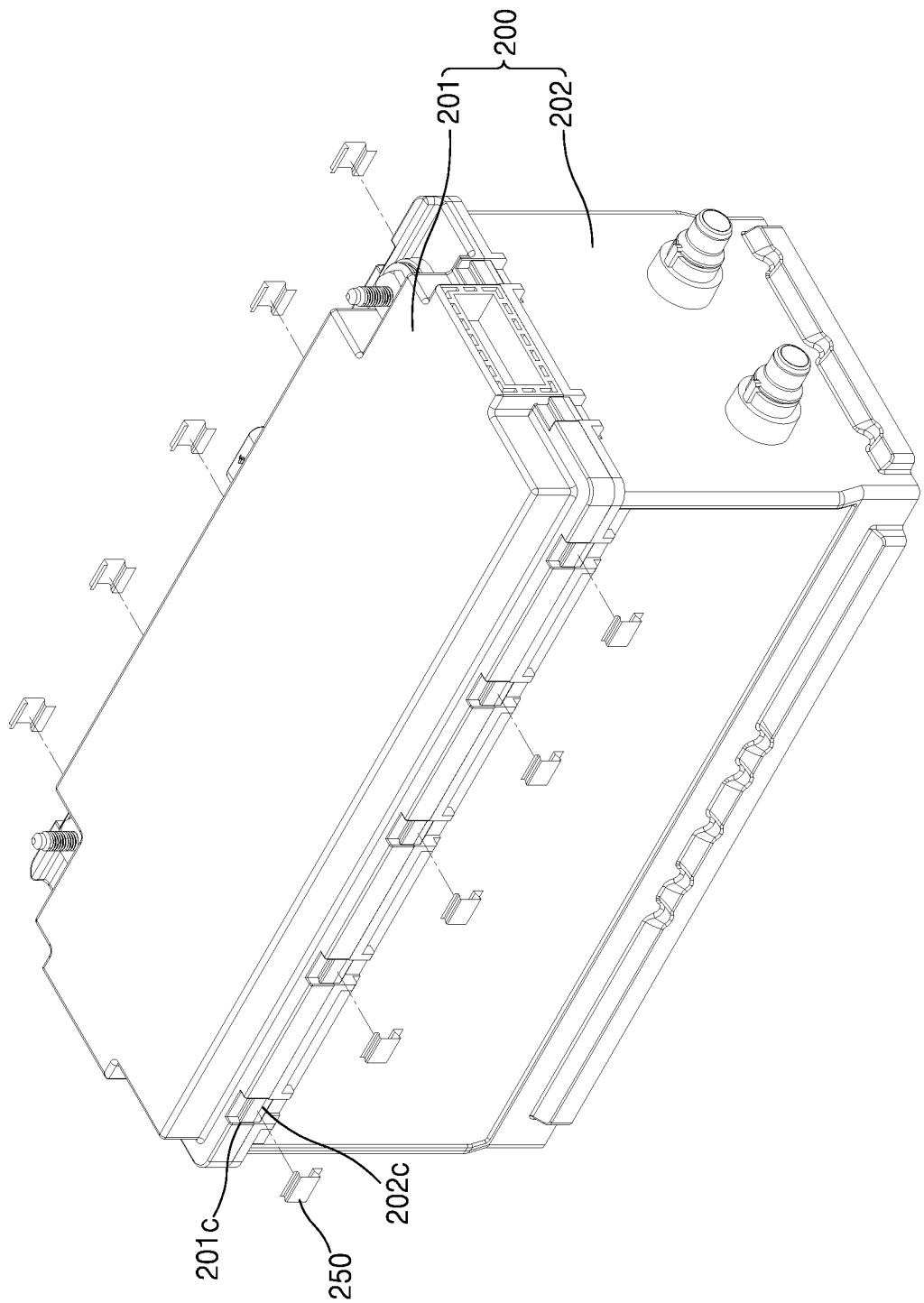
FIG. 12 is an perspective view illustrating a housing accommodating a core pack shown in FIG. 11 according to an embodiment of the present disclosure.

FIG. 12 is an perspective view illustrating a housing accommodating a core pack shown in FIG. 11 according to another embodiment of the present disclosure.

Referring to FIGS. 11 and 12, according to another embodiment of the present disclosure, a battery pack may include a core pack CP, which includes the case 100 in which a plurality of battery cells 10 are accommodated and a circuit board 180 mounted on an outside of the core pack CP, and a housing 200 accommodating the core pack CP. In addition, the housing 200 may include a housing main body 202 and a housing cover 201 that face each other and are coupled to each other with the core pack CP therebetween.

The housing main body 202 and the housing cover 201 may include different materials. For example, the housing main body 202 may include a metallic material, such as aluminum, and the housing cover 201 may include a resin material suitable for injection molding. The housing main body 202 and the housing cover 201 may be coupled to each other in a mutually-facing direction with the core pack CP therebetween. For example, the housing main body 202 and the housing cover 201, which include different materials from each other, may be coupled to each other by a clipping structure. For example, clip recesses 201c and 202c to which clips 250 will be fitted may be formed in the housing cover 201 and the housing main body 202, and after aligning the clip recesses 201c and 202c of the housing cover 201 and the housing main body 202 with each other, clips 250 may be fitted to adjoining clip recesses 201c and 202c to couple the housing cover 201 and the housing main body 202 to each other.

The housing main body 202 provides a space in which the core pack CP is entirely or mostly accommodated, and the housing cover 201 covers an upper portion of the housing main body 202 to seal the space. The housing main body 202 may include a metallic material, such as aluminum or an aluminum alloy, to provide structural rigidity to the battery pack and heat-dissipating performance, and an electric device packed with an insulative material, such as a relay 185 (see, e.g., FIG. 11) packed with an insulative resin, may be placed on a side of the circuit board 180 facing the housing main body 202 to electrically insulate the circuit board 180 and the housing main body 202 from each other. According to an embodiment of the present disclosure, the core pack CP shown in FIG. 11 may be accommodated in the housing main body 202 in a state (or orientation) such that the circuit board 180 may face a lateral side of the housing main body 202, and in this embodiment, the circuit board 180 and the housing main body 202 may be insulated from each other by the relay 185 placed between the circuit board 180 and the lateral side of the housing main body 202.

According to the present disclosure, a flow of the cooling fluid directly contacting the surfaces of the battery cells 10 is induced in the accommodation space A, and thus, heat-dissipating performance may be improved because heat is directly transferred from the battery cells by convection.

For example, according to the present disclosure, the inlet I and outlet O of the cooling fluid are formed in an end side of the case 100 in which the accommodation space A is formed to accommodate the battery cells 10, and a U-turn path is formed on the other end side of the case 100 to reverse the flow of the cooling fluid and, thus, to connect an upstream flow of the cooling fluid from to the inlet I with a downstream flow of the cooling fluid to the outlet O, thereby improving the cooling performance of the cooling fluid and simplifying an inlet/outlet connection structure.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. A battery pack comprising:
a plurality of battery cells;
a case providing an accommodation space for accommodating the battery cells and a cooling fluid for cooling the battery cells, the case having an inlet and an outlet; and
a barrier wall extending across the accommodation space and dividing the accommodation space into an upstream area in communication with the inlet for the cooling fluid and a downstream area in communication with the outlet for the cooling fluid, the barrier wall providing a communication area where the upstream area and the downstream area communicate with each other, the inlet and the outlet being at a portion of the case corresponding to a first end of the barrier wall in an extension direction of the barrier wall, the communication area being at a second end of the barrier wall in the extension direction of the barrier wall,
wherein the barrier wall is spaced apart from the inlet and the outlet in a direction perpendicular to the extension direction of the barrier wall.

2. The battery pack of claim 1, wherein the communication area is configured to reverse a direction of an upstream flow of the cooling fluid from the inlet at the first end of the barrier wall to a downstream flow toward the outlet at the first end of the barrier wall.

3. The battery pack of claim 1, wherein both the inlet and the outlet for the cooling fluid are provided in a first short-side portion of the case.

4. The battery pack of claim 3, wherein a second short-side portion of the case opposite the first short-side portion does not comprise an inlet or an outlet for the cooling fluid.

5. The battery pack of claim 1, wherein the communication area comprises an opening in the second end of the barrier wall.

6. A battery pack comprising:
a plurality of battery cells;
a case providing an accommodation space for accommodating the battery cells and a cooling fluid for cooling the battery cells; and
a barrier wall extending across the accommodation space and dividing the accommodation space into an upstream area in communication with an inlet for the cooling fluid and a downstream area in communication with an outlet for the cooling fluid, the barrier wall providing a communication area where the upstream area and the downstream area communicate with each other, the inlet and the outlet being at a portion of the case corresponding to a first end of the barrier wall in an extension direction of the barrier wall, the communication area being at a second end of the barrier wall in the extension direction of the barrier wall,
wherein the barrier wall has a step difference between a first height at the first end of the barrier wall and a second height at the second end of the barrier wall, and
wherein the communication area is formed by the step difference between the first height and the second height.

7. The battery pack of claim 6, wherein a first section of the barrier wall having the second height is at a middle position of a second section of the barrier wall having the first height such that an upper step difference and a lower step difference are formed between the first and second sections of the barrier wall.

8. The battery pack of claim 7, wherein the communication area comprises:
a first communication area formed by the upper step difference; and
a second communication area formed by the lower step difference.

9. The battery pack of claim 1, wherein the battery cells are arranged in a plurality of rows extending in the extension direction of the barrier wall, and
wherein the barrier wall extends along a gap between a first row and a second row to divide the rows of the battery cells into two groups.

10. The battery pack of claim 9, wherein the first and second rows are adjacent to each other such that the battery cells of the first row are at least partially between the battery cells of the second row, and
wherein the barrier wall has a zigzag shape along the gap between the first and second rows.

11. The battery pack of claim 1, wherein the case comprises a first cover, a middle case, and a second cover, the first and second covers facing each other with the middle case therebetween, the first and second covers being coupled to the middle case.

12. The battery pack of claim 11, wherein the barrier wall and the middle case are integrally formed by injection molding.

13. The battery pack of claim 11, wherein the middle case and the first and second covers are formed separately from each other, and wherein the case and the first and second covers seal the accommodation space.

14. The battery pack of claim 13, wherein the case comprises:
a first laser weld zone along a boundary between the middle case and the first cover; and
a second laser weld zone along a boundary between the middle case and the second cover.

15. The battery pack of claim 14, wherein the middle case and the first and second covers comprise an engineering plastic material for injection molding and laser welding.

16. The battery pack of claim 11, wherein the first and second covers comprise guide ribs protruding from the first and second covers and extending around first and second end portions of the battery cells.

17. The battery pack of claim 16, wherein the guide ribs have a ring shape and surround peripheries of the first and second end portions of the battery cells.

18. The battery pack of claim 16, wherein the guide ribs are arranged in rows such that the guide ribs of one row are between the guide ribs of an adjacent row, and
wherein the guide ribs are spaced apart from each other by gap portions, the guide ribs facing each other with the gap portions therebetween.

19. The battery pack of claim 18, wherein each of the gap portions is in a space between four adjacent guide ribs.

20. The battery pack of claim 18, wherein peripheries of each of the gap portions are surrounded by the guide ribs.

21. A battery pack comprising:
a plurality of battery cells;
a case providing an accommodation space for accommodating the battery cells and a cooling fluid for cooling the battery cells; and
a barrier wall extending across the accommodation space and dividing the accommodation space into an upstream area in communication with an inlet for the cooling fluid and a downstream area in communication with an outlet for the cooling fluid, the barrier wall providing a communication area where the upstream area and the downstream area communicate with each other, the inlet and the outlet being at a portion of the case corresponding to a first end of the barrier wall in an extension direction of the barrier wall, the communication area being at a second end of the barrier wall in the extension direction of the barrier wall,
wherein the case comprises a first cover, a middle case, and a second cover, the first and second covers facing each other with the middle case therebetween, the first and second covers being coupled to the middle case,
wherein the first and second covers comprise guide ribs protruding from the first and second covers,
wherein the guide ribs are arranged in rows such that the guide ribs of one row are between the guide ribs of an adjacent row,
wherein the guide ribs are spaced apart from each other by gap portions, the guide ribs facing each other with the gap portions therebetween,
wherein the barrier wall comprises first and second coupling portions arranged from the first end to the second end of the barrier wall in the extension direction of the barrier wall, each of the first and second coupling portions protrude toward respective ones of the gap portions of the first and second covers, and
wherein the first and second coupling portions are respectively fitted into the gap portion of the first and second covers and are welded thereto.

22. The battery pack of claim 21, wherein the barrier wall and the middle case are integrally formed by injection molding, and
wherein the first and second coupling portions protrude from the barrier wall toward the first and second covers.

* * * * *